(12) United States Patent
Nelson et al.

(10) Patent No.: US 10,309,374 B2
(45) Date of Patent: Jun. 4, 2019

(54) ENERGY KITE WINCHING USING BUOYANCY

(71) Applicant: Makani Technologies LLC, Alameda, CA (US)

(72) Inventors: Robert Nelson, Alameda, CA (US); Brian Hachtmann, San Martin, CA (US)

(73) Assignee: Makani Technologies LLC, Alameda, CA (US)

( * ) Notice: Subject to any disclaimer, the term of this patent is extended or adjusted under 35 U.S.C. 154(b) by 143 days.

(21) Appl. No.: 15/366,830

(22) Filed: Dec. 1, 2016

(65) Prior Publication Data
US 2018/0156199 A1  Jun. 7, 2018

(51) Int. Cl.
| | |
|---|---|
| B64C 39/02 | (2006.01) |
| F03D 9/32 | (2016.01) |
| F03D 9/25 | (2016.01) |
| F03D 13/25 | (2016.01) |
| B63B 21/50 | (2006.01) |

(Continued)

(52) U.S. Cl.
CPC .............. *F03D 9/32* (2016.05); *B63B 21/50* (2013.01); *B63B 35/50* (2013.01); *B64C 39/022* (2013.01); *B64F 3/02* (2013.01); *F03D 5/00* (2013.01); *F03D 7/00* (2013.01); *F03D 9/25* (2016.05); *F03D 13/25* (2016.05); *B63B 2205/00* (2013.01); *B64D 2221/00* (2013.01); *F05B 2240/921* (2013.01); *F05B 2240/93* (2013.01); *Y02E 10/70* (2013.01); *Y02E 10/723* (2013.01); *Y02E 10/725* (2013.01); *Y02E 10/727* (2013.01)

(58) Field of Classification Search
CPC ..... F03D 9/00; F03D 9/25; F03D 9/32; B63B 35/50; B64B 1/50; B64C 31/06; B64C 2031/065; B64C 39/022; B64F 3/02
See application file for complete search history.

(56) References Cited

U.S. PATENT DOCUMENTS

| | | | | |
|---|---|---|---|---|
| 4,092,827 A | * | 6/1978 | Schneider ................. | B64B 1/50 137/236.1 |
| 4,166,596 A | * | 9/1979 | Mouton, Jr. .............. | B64B 1/50 244/30 |

(Continued)

FOREIGN PATENT DOCUMENTS

| | | |
|---|---|---|
| WO | 2010030471 | 3/2010 |
| WO | 2010143214 A1 | 12/2010 |

(Continued)

OTHER PUBLICATIONS

International Searching Authority, International Search Report and Written Opinion dated Mar. 19, 2018, issued in conneciton with International Patent Application No. PCT/US2017/061571, filed on Nov. 14, 2017, 16 pages.

*Primary Examiner* — Richard R. Green
*Assistant Examiner* — Michael A. Fabula
(74) *Attorney, Agent, or Firm* — McDonnell Boehnen Hulbert & Berghoff LLP

(57) ABSTRACT

Offshore airborne wind turbine systems with an aerial vehicle connected via a tether to an adjustably buoyant body. The tether may be coupled to an underwater mooring through which it may move, or it may be coupled to a floating platform through which it may move. The buoyancy of the buoyant body may be adjusted to change the tension in the tether or for other purposes.

14 Claims, 16 Drawing Sheets

(51) Int. Cl.
  *B63B 35/50*     (2006.01)
  *B64F 3/02*      (2006.01)
  *F03D 5/00*      (2006.01)
  *F03D 7/00*      (2006.01)

(56) References Cited

U.S. PATENT DOCUMENTS

| | | | | |
|---|---|---|---|---|
| 5,435,259 | A * | 7/1995 | Labrador | B01D 61/10 114/39.31 |
| 6,925,949 | B1 * | 8/2005 | Phillips | B63H 9/0685 114/102.1 |
| 7,296,971 | B2 | 11/2007 | Borgen | |
| 7,456,515 | B2 | 11/2008 | Nielsen | |
| 7,504,741 | B2 * | 3/2009 | Wrage | F03D 5/00 290/44 |
| 8,117,977 | B2 * | 2/2012 | Reusch | B63H 9/0685 114/102.1 |
| 9,003,631 | B2 | 4/2015 | Yamamoto et al. | |
| 9,227,168 | B1 * | 1/2016 | DeVaul | B01J 19/08 |
| 9,598,170 | B2 * | 3/2017 | Vander Lind | B64C 31/06 |
| 9,784,243 | B2 * | 10/2017 | Vander Lind | B63H 9/0685 |
| 9,989,038 | B2 * | 6/2018 | Barber | B63B 1/121 |
| 2008/0240864 | A1 | 10/2008 | Belinsky | |
| 2009/0127860 | A1 * | 5/2009 | Brown | E02B 9/08 290/53 |
| 2010/0001534 | A1 * | 1/2010 | Kim | F03B 17/061 290/55 |
| 2010/0107627 | A1 * | 5/2010 | Morgan | B63B 35/44 60/495 |
| 2010/0213718 | A1 * | 8/2010 | Kelly | F03D 5/04 290/55 |
| 2011/0192938 | A1 * | 8/2011 | DiMarzio | B64B 1/50 244/53 R |
| 2012/0049533 | A1 * | 3/2012 | Kelly | F03D 5/04 290/55 |
| 2012/0319407 | A1 * | 12/2012 | Glass | F03D 1/04 290/55 |
| 2013/0193266 | A1 | 8/2013 | DiMarzio et al. | |
| 2014/0062094 | A1 * | 3/2014 | Chan | F03D 9/255 290/55 |
| 2014/0339832 | A1 * | 11/2014 | Goldstein | F03B 13/00 290/55 |
| 2015/0183512 | A1 | 7/2015 | Jensen et al. | |
| 2015/0183516 | A1 * | 7/2015 | Vander Lind | B64C 39/022 244/155 R |
| 2015/0183527 | A1 * | 7/2015 | Hachtmann | B64F 1/12 244/110 E |
| 2015/0232200 | A1 * | 8/2015 | Vander Lind | B64F 1/12 244/110 C |
| 2015/0275861 | A1 * | 10/2015 | Goldstein | B64B 1/50 290/44 |
| 2015/0353194 | A1 * | 12/2015 | Chubb | B64C 39/022 244/1 TD |
| 2015/0354543 | A1 * | 12/2015 | Seternes | B63B 35/44 416/6 |
| 2017/0175713 | A1 * | 6/2017 | Barber | B63B 1/121 |
| 2017/0321653 | A1 * | 11/2017 | Rebsdorf | F03D 7/0228 |
| 2017/0356423 | A1 * | 12/2017 | Galdos Tobalina | B63B 35/44 |
| 2017/0363066 | A1 * | 12/2017 | Hart | F03D 9/25 |
| 2017/0363067 | A1 * | 12/2017 | Hart | F03D 9/32 |
| 2017/0363069 | A1 * | 12/2017 | Hart | F03D 13/25 |
| 2017/0363070 | A1 * | 12/2017 | Hart | F03D 13/25 |
| 2018/0050764 | A1 * | 2/2018 | Moffat | F03D 9/25 |
| 2018/0149137 | A1 * | 5/2018 | Nordstrom | F03D 5/00 |

FOREIGN PATENT DOCUMENTS

| | | |
|---|---|---|
| WO | 2013096345 A1 | 6/2013 |
| WO | 2016059040 A1 | 4/2016 |

* cited by examiner

ENERGY KITE WINCHING USING BUOYANCY

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine or AWT.

SUMMARY

An offshore airborne wind turbine system now provides a viable way to harness wind energy in offshore applications that were previously unavailable. Offshore airborne wind turbine systems with an aerial vehicle connected via a tether to an underwater buoyant body where the buoyancy is adjustable are described herein. The buoyancy of the body may be adjusted depending on the flight mode of the aerial vehicle. This airborne wind turbine system does not require large towers attached to the seabed and is therefore suitable for use in deep offshore locations as it may utilize elements that may be simply moored to the ocean floor.

In one aspect, an offshore airborne wind turbine system may include an aerial vehicle, an underwater mooring, an underwater adjustably buoyant body, and a tether coupled to the underwater mooring and configured to move through the underwater mooring. The tether may include a first portion extending upwards from the underwater mooring and coupled to the aerial vehicle, and a second portion extending upwards from the underwater mooring and coupled to the adjustably buoyant body.

In another aspect, an offshore airborne wind turbine system may include an aerial vehicle, a floating platform configured as a landing platform for the aerial vehicle, an adjustably buoyant body, and a tether coupled to the floating platform and configured to move through the floating platform. The tether may include a first portion extending upwards from the floating platform and coupled to the aerial vehicle, and a second portion extending downwards from the floating platform and coupled to the adjustably buoyant body.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. OVERVIEW

Example embodiments herein generally relate to airborne wind turbine systems and offshore airborne wind turbine systems with an aerial vehicle connected via a tether to an underwater buoyant body where the buoyancy is adjustable. In one embodiment, the tether may be routed down through an undersea mooring and back up to an underwater buoyant body where the buoyancy is adjustable, such as an inflatable bladder. In another embodiment, the tether may be routed through a floating landing platform to an underwater buoyant body. The buoyancy of the body may be adjusted depending on the flight mode of the aerial vehicle.

Systems and information described with respect to FIGS. 1 through 6C are generally illustrative of airborne wind turbines and may apply to offshore airborne wind turbines. Systems and methods described with respect to FIG. 7 and beyond are illustrative of offshore airborne wind turbines.

II. ILLUSTRATIVE SYSTEMS

A. Airborne Wind Turbine (AWT)

Figure 1:
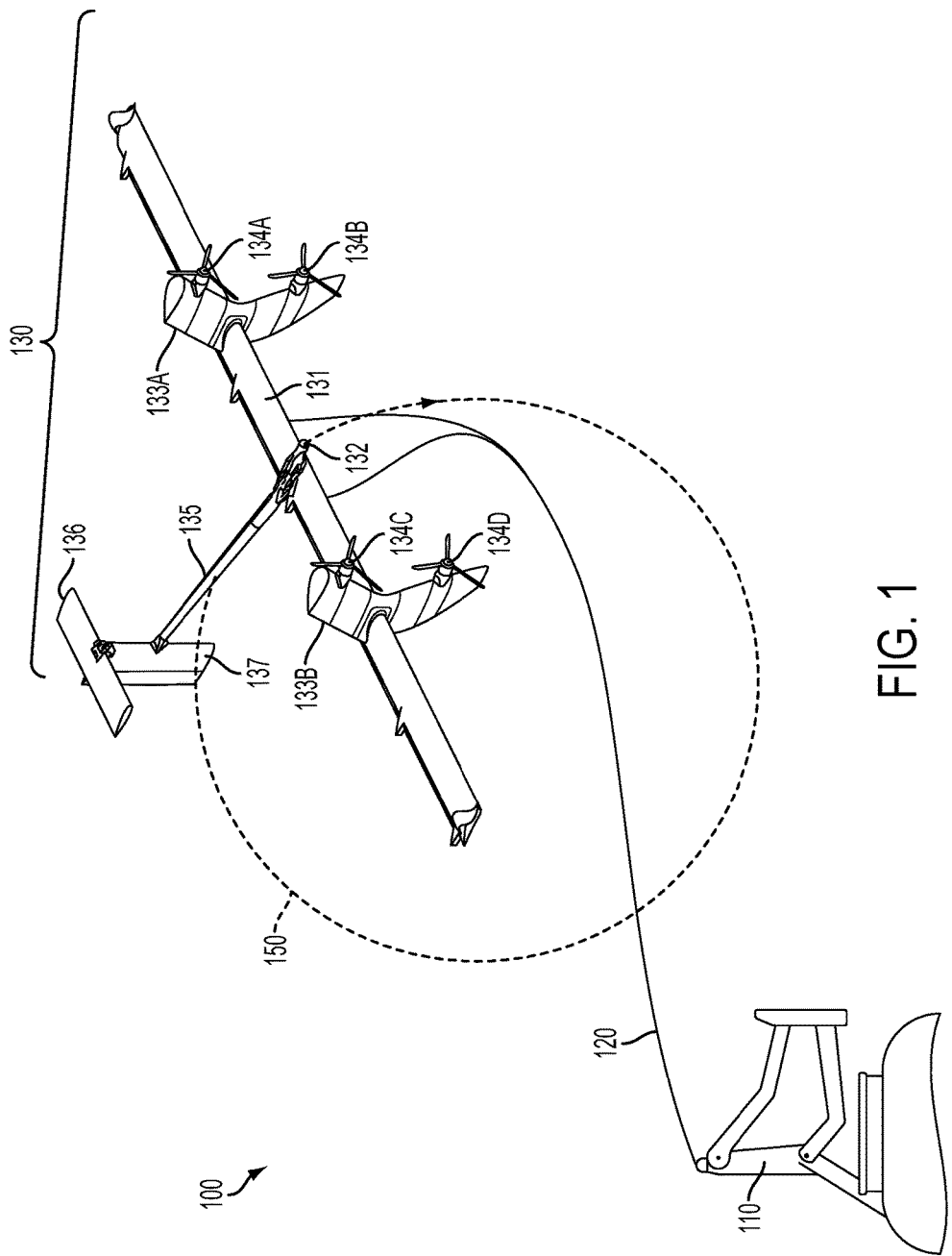
FIG. 1 depicts an Airborne Wind Turbine (AWT), according to an example embodiment.

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be configured to hold and/or support the aerial vehicle 130 until it is in an operational mode. The ground station 110 also may be configured to allow for the repositioning of the aerial vehicle 130 such that deployment of aerial vehicle 130 is possible. Further, the ground station 110 may be configured to receive the aerial vehicle 130 during a landing. The ground station 110 may be formed of any material that can suitably keep the aerial vehicle 130 attached and/or anchored to the ground while in hover flight, forward flight, and/or crosswind flight. In some implementations, a ground station 110 may be configured for use on land. However, a ground station 110 also may be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the deployed tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 also may be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may include or take the form of various types of devices, such as a kite (as illustrated in FIG. 1), a wing, and/or an airplane, among other possibilities. The aerial vehicle 130 may be formed of structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced above and below the main wing 131. In some examples, a vertical spacing between corresponding rotors (e.g., rotor 134A and rotor 134B or rotor 134C and rotor 134D) may be 0.5 to 3 meters.

The rotors 134A-D may be configured to drive one or more motor-generators for the purpose of generating electrical energy when the vehicle is operated in an electrical power generation mode. The rotors 134A-D may each include one or more blades, such as two, three, four, five, or more blades. The one or more rotor blades may rotate via interactions with the wind (or apparent wind) and be used to drive the one or more motor-generators. In addition, the rotors 134A-D also may be configured to provide a thrust to the aerial vehicle 130 during flight. With this arrangement, each of the rotors 134A-D may function as a propulsion units, such as a propeller, driven by a motor-generators when the vehicle is operated in a thrust flight mode. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 to 6 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 1 to 5 meters. Further, in some examples, the tail wing 136 may be located above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
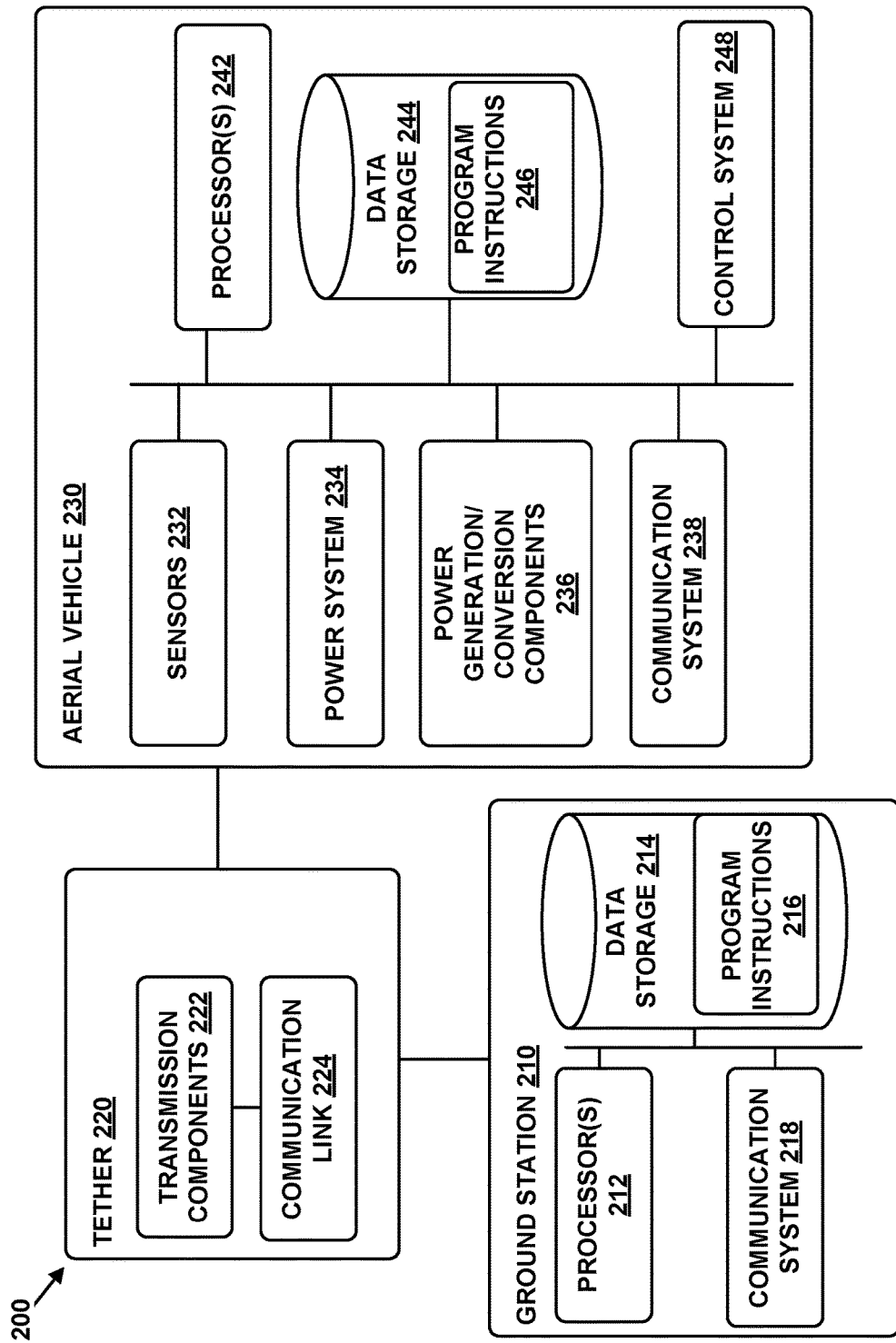
FIG. 2 is a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs also may be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more motor-generators, such as high-speed, direct-drive motor-generators. With this arrangement, the one or more motor-generators may drive and be driven by one or more rotors, such as the rotors 134A-D. And in at least one such example, the one or more motor-generators may operate at full rated power at wind speeds of 11.5 meters per second at a capacity factor which may exceed 60 percent, and the one or more motor-generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

C. Transitioning an Aerial Vehicle from Hover Flight to Crosswind Flight

Figure 3A:
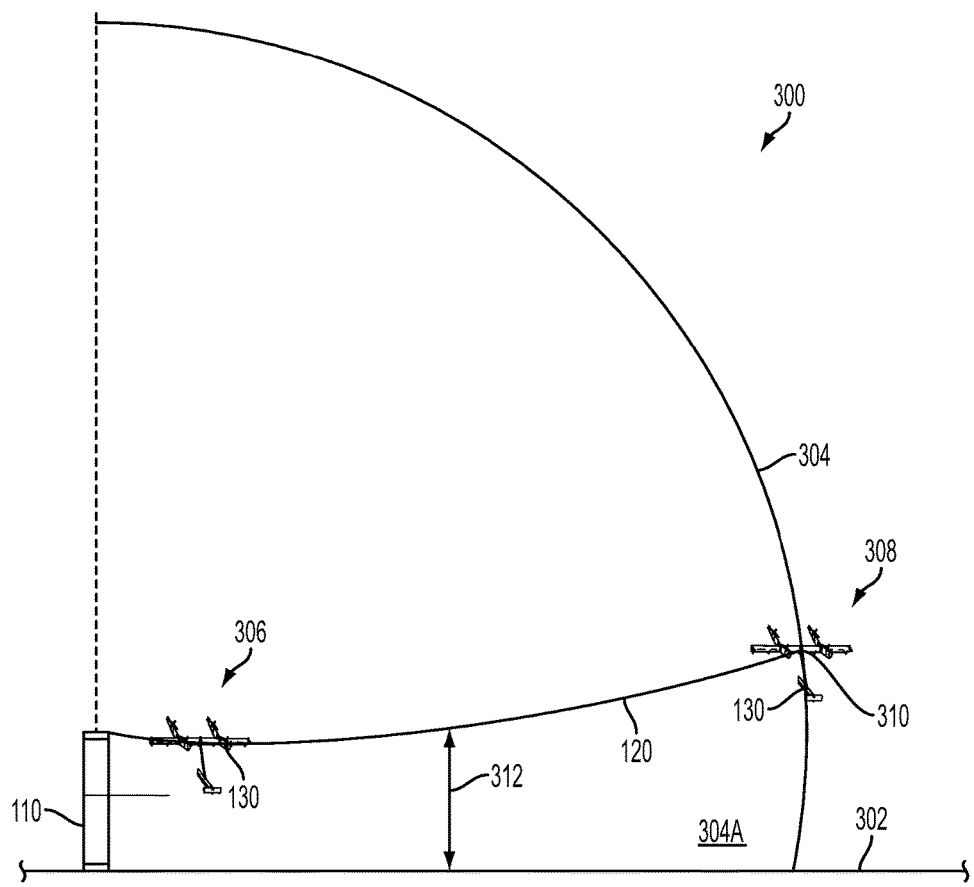
FIGS. 3A and 3B depict an example of an aerial vehicle transitioning from hover flight to crosswind flight, according to an example embodiment.
Figure 3B:
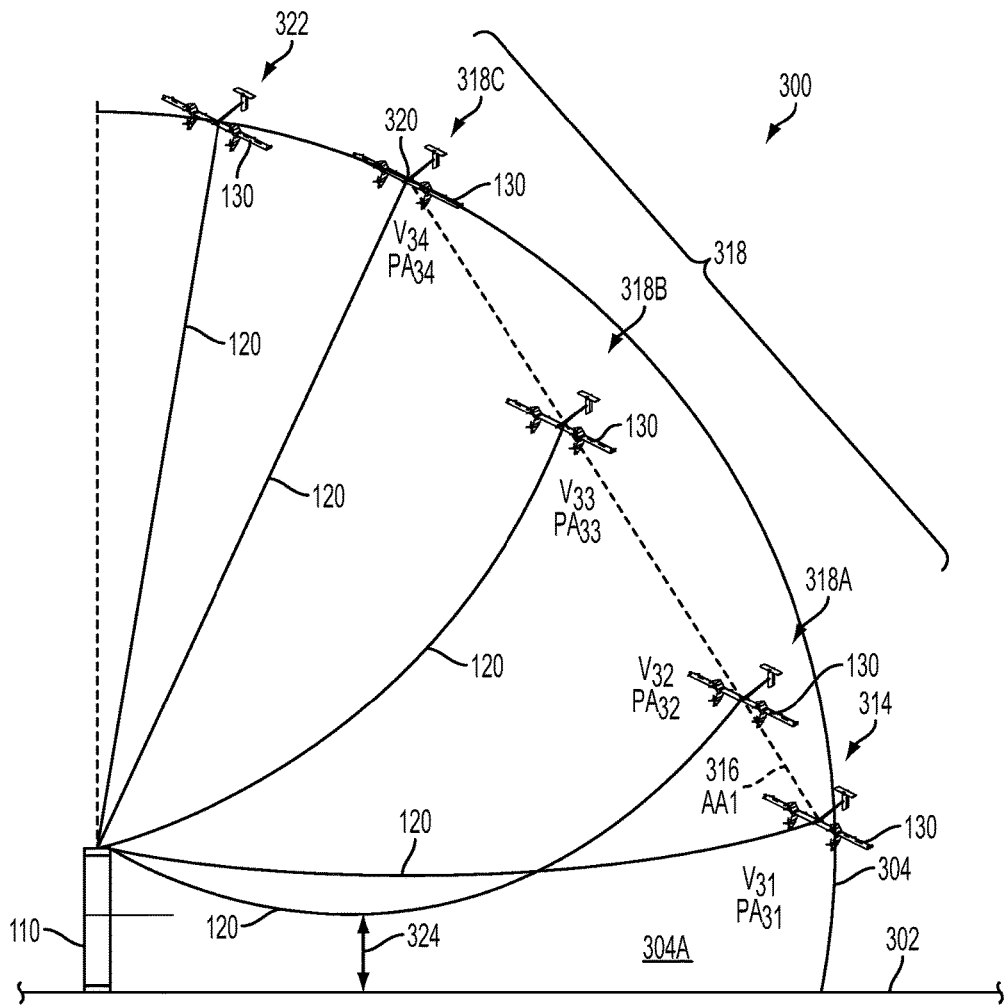

FIGS. 3A and 3B depict an example 300 of transitioning an aerial vehicle from hover flight to crosswind flight, according to an example embodiment. Hover flight may be an example of the AWT operating in thrust flight mode, with the motor-generators consuming power and driving the rotor rotation to provide thrust to the AWT. Crosswind flight may be an example of drag flight mode, with the wind or apparent wind rotating the rotors and the rotors driving the motor-generators to generate electrical power. Example 300 is generally described by way of example as being carried out by the aerial vehicle 130 described above in connection with FIG. 1. For illustrative purposes, example 300 is described in a series of actions as shown in FIGS. 3A and 3B, though example 300 could be carried out in any number of actions and/or combination of actions.

As shown in FIG. 3A, the aerial vehicle 130 is connected to the tether 120, and the tether 120 is connected to the ground station 110. The ground station 110 is located on ground 302. Moreover, as shown in FIG. 3, the tether 120 defines a tether sphere 304 having a radius based on a length of the tether 120, such as a length of the tether 120 when it is extended. Example 300 may be carried out in and/or substantially on a portion 304A of the tether sphere 304. The term "substantially on," as used in this disclosure, refers to exactly on and/or one or more deviations from exactly on that do not significantly impact transitioning an aerial vehicle between certain flight modes as described herein.

Example 300 begins at a point 306 with deploying the aerial vehicle 130 from the ground station 110 in a hover-flight orientation. With this arrangement, the tether 120 may be paid out and/or reeled out. In some implementations, the aerial vehicle 130 may be deployed when wind speeds increase above a threshold speed (e.g., 3.5 m/s) at a threshold altitude (e.g., over 200 meters above the ground 302).

Further, at point 306 the aerial vehicle 130 may be operated in the hover-flight orientation. When the aerial vehicle 130 is in the hover-flight orientation, the aerial vehicle 130 may engage in hover flight. For instance, when the aerial vehicle engages in hover flight, the aerial vehicle 130 may ascend, descend, and/or hover over the ground 302. When the aerial vehicle 130 is in the hover-flight orientation, a span of the main wing 131 of the aerial vehicle 130 may be oriented substantially perpendicular to the ground 302. The term "substantially perpendicular," as used in this disclosure, refers to exactly perpendicular and/or one or more deviations from exactly perpendicular that do not significantly impact transitioning an aerial vehicle between certain flight modes as described herein.

Example 300 continues at a point 308 while the aerial vehicle 130 is in the hover-flight orientation positioning the aerial vehicle 130 at a first location 310 that is substantially on the tether sphere 304. As shown in FIG. 3A, the first location 310 may be in the air and substantially downwind of the ground station 110.

The term "substantially downwind," as used in this disclosure, refers to exactly downwind and/or one or more deviations from exactly downwind that do not significantly impact transitioning an aerial vehicle between certain flight modes as described herein.

For example, the first location 310 may be at a first angle from an axis extending from the ground station 110 that is substantially parallel to the ground 302. In some implementations, the first angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 310 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis. The term "substantially parallel," as used in this disclosure refers to exactly parallel and/or one or more deviations from exactly parallel that do not significantly impact transitioning an aerial vehicle between certain flight modes described herein.

At point 308, the aerial vehicle 130 may accelerate in the hover-flight orientation. For example, at point 308, the aerial vehicle 130 may accelerate up to a few meters per second. In addition, at point 308, the tether 120 may take various different forms in various different embodiments. For example, as shown in FIG. 3A, at point 308 the tether 120 may be extended. With this arrangement, the tether 120 may be in a catenary configuration. Moreover, at point 306 and point 308, a bottom of the tether 120 may be a predetermined altitude 312 above the ground 302. With this arrangement, at point 306 and point 308 the tether 120 may not contact the ground 302.

Example 300 continues at point 314 with transitioning the aerial vehicle 130 from the hover-flight orientation to a forward-flight orientation, such that the aerial vehicle 130 moves from the tether sphere 304. As shown in FIG. 3B, the aerial vehicle 130 may move from the tether sphere 304 to a location toward the ground station 110 (which may be referred to as being inside the tether sphere 304).

When the aerial vehicle 130 is in the forward-flight orientation, the aerial vehicle 130 may engage in forward flight (which may be referred to as airplane-like flight). Forward flight may be an example of the AWT operating in thrust flight mode, with the motor-generators consuming power and driving the rotor rotation to provide thrust to the AWT. For instance, when the aerial vehicle 130 engages in forward flight, the aerial vehicle 130 may ascend. The forward-flight orientation of the aerial vehicle 130 could take the form of an orientation of a fixed-wing aircraft (e.g., an airplane) in horizontal flight. In some examples, transitioning the aerial vehicle 130 from the hover-flight orientation to the forward-flight orientation may involve a flight maneuver, such as pitching forward. And in such an example, the flight maneuver may be executed within a time period, such as less than one second.

At point 314, the aerial vehicle 130 may achieve attached flow. Further, at point 314, a tension of the tether 120 may be reduced. With this arrangement, a curvature of the tether 120 at point 314 may be greater than a curvature of the tether 120 at point 308. As one example, at point 314, the tension of the tether 120 may be less than 1 KN, such as 500 newtons (N).

Example 300 continues at one or more points 318 with operating the aerial vehicle 130 in the forward-flight orientation to ascend at an angle of ascent AA1 to a second location 320 that is substantially on the tether sphere 304. As shown in FIG. 3B, the aerial vehicle 130 may fly substantially along a path 316 during the ascent at one or more points 318. In this example, one or more points 318 is shown as three points, a point 318A, a point 318B, and a point 318C. However, in other examples, one or more points 318 may include less than three or more than three points.

In some examples, the angle of ascent AA1 may be an angle between the path 316 and the ground 302. Further, the path 316 may take various different forms in various different embodiments. For instance, the path 316 may be a line segment, such as a chord of the tether sphere 304.

In some implementations, the aerial vehicle 130 may have attached flow during the ascent. Moreover, in such an implementation, effectiveness of one or more control surfaces of the aerial vehicle 130 may be maintained. Further, in such an implementation, example 300 may involve selecting a maximum angle of ascent, such that the aerial vehicle 130 has attached flow during the ascent. Moreover, in such an implementation, example 300 may involve adjusting a pitch angle of the aerial vehicle 130 based on the maximum angle of ascent and/or adjusting thrust of the aerial vehicle 130 based on the maximum angle of ascent. In some examples, adjusting thrust of the aerial vehicle 130 may involve using differential thrusting of one or more of the rotors 134A-D of the aerial vehicle 130. The pitch angle may be an angle between the aerial vehicle 130 and a vertical axis that is substantially perpendicular to the ground 302.

As shown in FIG. 3B, at point 314 the aerial vehicle 130 may have a speed V31 and a pitch angle PA31; at point 318A the aerial vehicle 130 may have a speed V32 and a pitch angle PA32; at point 318B the aerial vehicle 130 may have a speed V33 and a pitch angle PA33; and at point 318C the aerial vehicle 130 may have a speed V34 and a pitch angle PA34.

In some implementations, the angle of ascent AA1 may be selected before point 318A. With this arrangement, the pitch angle PA31 and/or the pitch angle PA32 may be selected based on the angle of ascent AA1. Further, in some examples, the pitch angle PA32, the pitch angle PA33, and/or the pitch angle PA34 may be equal to the pitch angle PA31. However, in other examples, the pitch angles PA31, PA32, PA33, and/or PA34 may be different than each other. For instance, the pitch angle PA31 may be greater or less than pitch angles PA32, PA33, and/or PA34; the pitch angle PA32 may be greater or less than pitch angles PA33, PA34, and/or PA31; the pitch angle PA33 may be greater or less than pitch angles PA34, PA31, and/or PA32; and the pitch angle PA34 may be greater or less than pitch angles PA31, PA32, and/or PA33. Further, the pitch angle PA33 and/or PA34 may be selected and/or adjusted during the ascent. Further still, the pitch angle PA31 and/or PA32 may be adjusted during the ascent.

Moreover, in some implementations, the speed V31 and/or the speed V32 may be selected based on the angle of ascent AA1. Further, in some examples, the speed V32, the speed V33, and the speed V34 may be equal to the speed V31. However, in other examples, speeds V31, V32, V33, and V34 may be different than each other. For example, the speed V34 may be greater than the speed V33, the speed V33 may be greater than the speed V32, and the speed V32 may be greater than the speed V31. Further, speeds V31, V32, V33, and/or V34 may be selected and/or adjusted during the ascent.

In some implementations, any or all of the speeds V31, V32, V33, and/or V34 may be a speed that corresponds with a maximum (or full) throttle of the aerial vehicle 130. Further, in some implementations, at the speed V32, the aerial vehicle 130 may ascend in a forward-flight orientation. Moreover, at the speed V32, the angle of ascent AA1 may be converged.

As shown in FIG. 3B, the second location 320 may be in the air and substantially downwind of the ground station 110. The second location 320 may be oriented with respect to the ground station 110 in a similar way as the first location 310 may be oriented with respect to the ground station 110.

For example, the second location 320 may be at a first angle from an axis extending from the ground station 110 that is substantially parallel to the ground 302. In some implementations, the first angle may be 30 degrees from the axis. In some situations, the first angle may be referred to as azimuth, and the angle may be between 30 degrees clockwise from the axis and 330 degrees clockwise from the axis, such as 15 degrees clockwise from the axis or 345 degrees clockwise from the axis.

In addition, as shown in FIG. 3B, the second location 320 may be substantially upwind of the first location 310. The term "substantially upwind," as used in this disclosure, refers to exactly upwind and/or one or more deviations from exactly upwind that do not significantly impact transitioning an aerial vehicle between certain flight modes as described herein.

At one or more points 318, a tension of the tether 120 may increase during the ascent. For example, a tension of the tether 120 at point 318C may be greater than a tension of the tether 120 at point 318B, a tension of the tether 120 at point 318B may be greater than a tension of the tether 120 at point 318A. Further, a tension of the tether 120 at point 318A may be greater than a tension of the tether at point 314.

With this arrangement, a curvature of the tether 120 may decrease during the ascent. For example, a curvature the tether 120 at point 318C may be less than a curvature the tether at point 318B, and a curvature of the tether 120 at point 318B may be less than a curvature of the tether at point 318A. Further, in some examples, a curvature of the tether 120 at point 318A may be less than a curvature of the tether 120 at point 314.

Moreover, in some examples, when the aerial vehicle 130 includes a GPS receiver, operating the aerial vehicle 130 in the forward-flight orientation to ascend at an angle of ascent may involve monitoring the ascent of the aerial vehicle 130 with the GPS receiver. With such an arrangement, control of a trajectory of the aerial vehicle 130 during the ascent may be improved. As a result, the aerial vehicle 130's ability to follow one or more portions and/or points of the path 316 may be improved.

Further, in some examples, when the aerial vehicle 130 includes at least one pitot tube, operating the aerial vehicle 130 in a forward-flight orientation to ascend at an angle of ascent may involve monitoring an angle of attack of the aerial vehicle 130 or a side slip of the aerial vehicle 130 during the ascent with the at least one pitot tube. With such an arrangement, control of the trajectory of the aerial vehicle during the ascent may be improved. As a result, the aerial vehicle 130's ability to follow one or more portions and/or points of the path 316 may be improved. The angle of attack may be an angle between a body axis of the aerial vehicle 130 and an apparent wind vector. Further, the side slip may be an angle between a direction substantially perpendicular to a heading of the aerial vehicle 130 and the apparent wind vector.

Example 300 continues at a point 322 with transitioning the aerial vehicle 130 from the forward-flight orientation to a crosswind-flight orientation. In some examples, transitioning the aerial vehicle 130 from the forward-flight orientation to the crosswind-flight orientation may involve a flight maneuver.

When the aerial vehicle 130 is in the crosswind-flight orientation, the aerial vehicle 130 may engage in crosswind flight. For instance, when the aerial vehicle 130 engages in crosswind flight, the aerial vehicle 130 may fly substantially along a path, such as path 150, to generate electrical energy. In some implementations, a natural roll and/or yaw of the aerial vehicle 130 may occur during crosswind flight.

As shown in FIG. 3B, at points 314-322 a bottom of the tether 120 may be a predetermined altitude 324 above the ground 302. With this arrangement, at points 314-322 the tether 120 may not touch the ground 302. In some examples, the predetermined altitude 324 may be less than the predetermined altitude 312. In some implementations, the predetermined altitude 324 may be greater than one half of the height of the ground station 110. And in at least one such implementation, the predetermined altitude 324 may be 6 meters.

Thus, example 300 may be carried out so that the tether 120 may not contact the ground 302. With such an arrangement, the mechanical integrity of the tether 120 may be improved. For example, the tether 120 might not catch on (or tangle around) objects located on the ground 302. As another example, when the tether sphere 304 is located above a body of water (e.g., an ocean, a sea, a lake, a river, and the like), the tether 120 might not be submersed in the water. In addition, with such an arrangement, safety of one or more people located near the ground station 110 (e.g., within the portion 304A of the tether sphere 304) may be improved.

In addition, example 300 may be carried out so that a bottom of the tether 120 remains above the predetermined altitude 324. With such an arrangement, the mechanical integrity of the tether 120 may be improved as described herein and/or safety of one or more people located near the ground station 110 (e.g., within the portion 304A of the tether sphere 304) may be improved.

Moreover, one or more actions that correspond with points 306-322 may be performed at various different time periods in various different embodiments. For instance, the one or more actions that correspond with point 306 may be performed at a first time period, the one or more actions that correspond with point 308 may be performed at a second time period, the one or more actions that correspond with point 314 may be performed at a third time period, the one or more actions that correspond with point 318A may be performed at a fourth time period, the one or more actions that correspond with point 318B may be performed at a fifth time period, the one or more actions that correspond with point 318C may be performed at a sixth time period, and the one or more actions that correspond with point 322 may be performed at a seventh time period. However, in other examples, at least some of the actions of the one or more actions that correspond with points 306-322 may be performed concurrently.

Figure 4A:
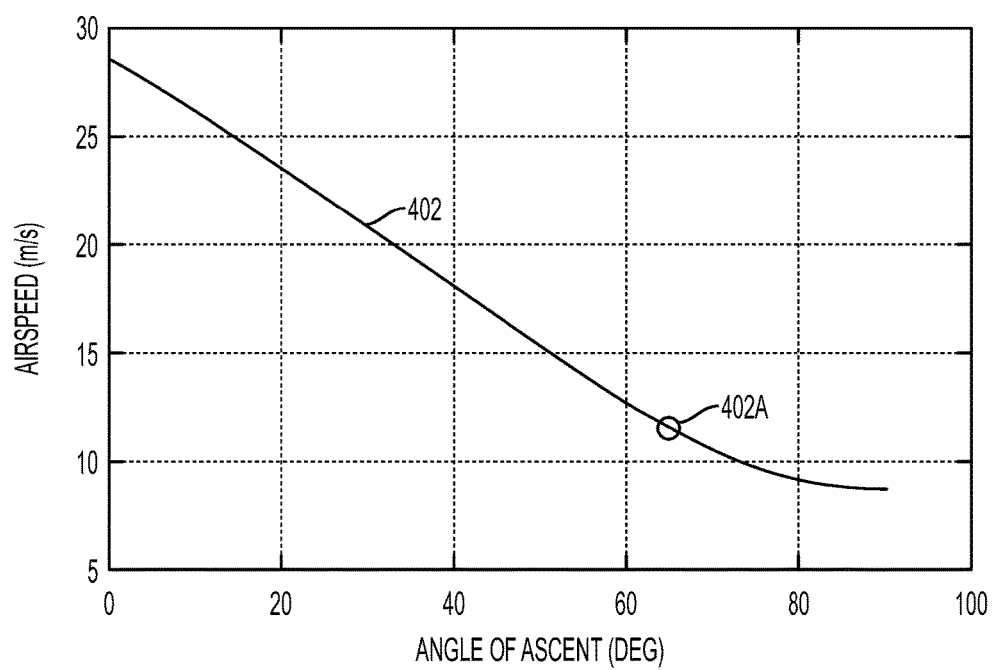
FIGS. 4A-C are graphical representations involving an angle of ascent, according to an example embodiment.
Figure 4B:
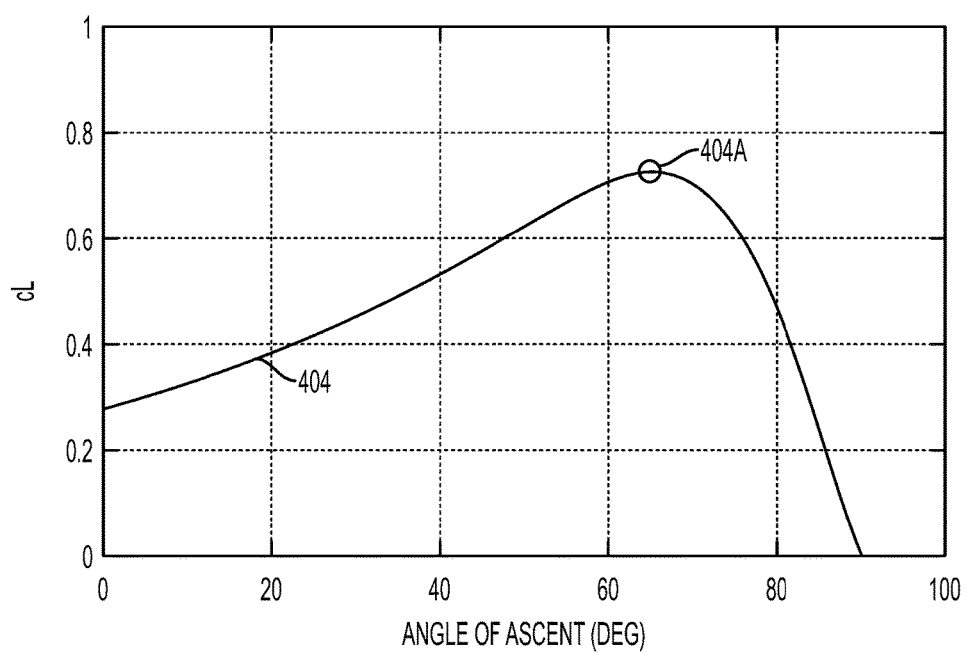
Figure 4C:
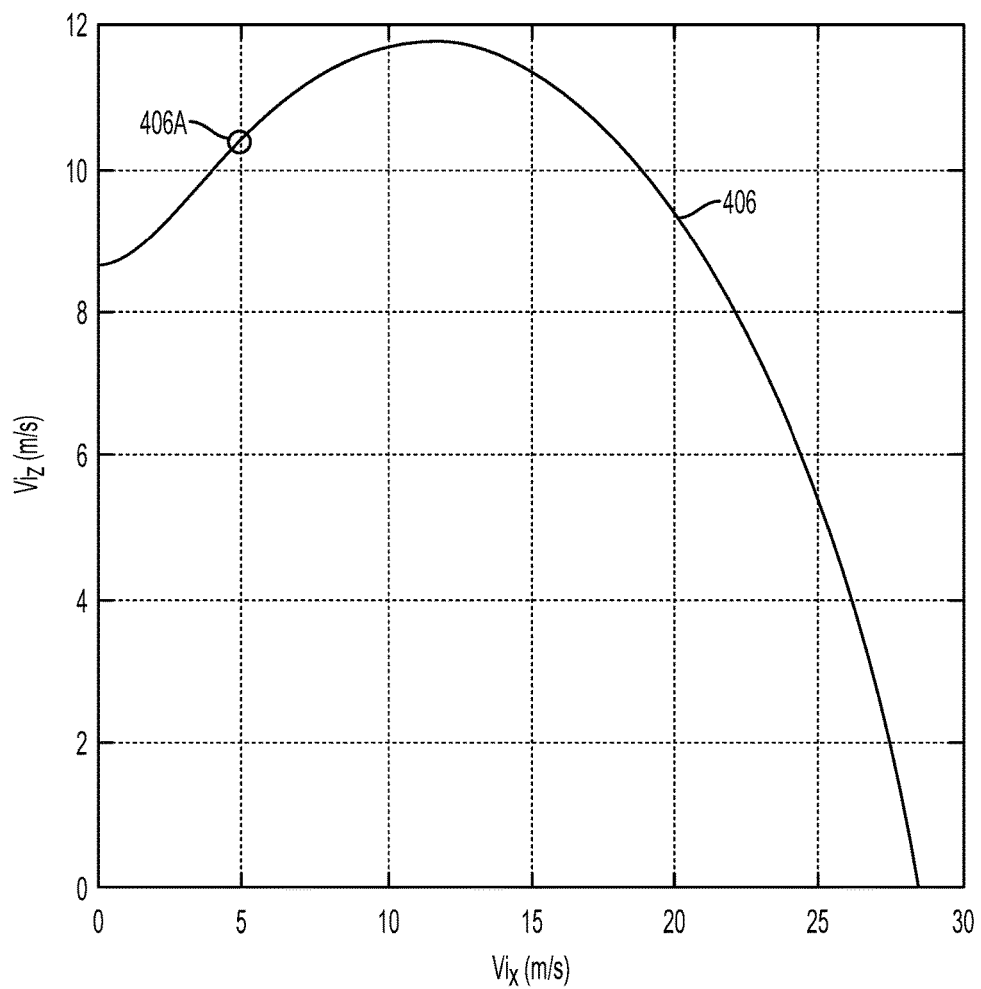

FIGS. 4A-C are graphical representations involving an angle of ascent, according to an example embodiment. In particular, FIG. 4A is a graphical representation 402, FIG. 4B is a graphical representation 404, and FIG. 4C is a graphical representation 406. Each of graphical representations 402, 404, and 406 may be based on example 300.

More specifically, in FIGS. 4A-C, an aerial vehicle in an example of transitioning the aerial vehicle from hover flight to crosswind flight may have a thrust-to-weight ratio (T/W) of 1.3 and a coefficient of drag ($C_D$) equal to the equation $3+(C_L^2/eAR\pi)$, where $C_L$ is coefficient of lift, e is span efficiency of the aerial vehicle, and AR is aspect ratio of the aerial vehicle. However, in other examples, aerial vehicles described herein may have various other thrust-to-weight ratios, such as a thrust-to-weight ratio greater than 1.2. Further, in other examples, aerial vehicles described herein may have various other values of $C_D$, such as a value of $C_D$ between 0.1 and 0.2.

As noted, FIG. 4A is the graphical representation 402. In particular, the graphical representation 402 depicts an angle of ascent of an aerial vehicle in relation to air speed. In graphical representation 402, the angle of ascent may be measured in degrees, and the airspeed may be measured in m/s. As shown in FIG. 4A, a point 402A on the graphical representation 402 may represent a maximum angle of ascent of an aerial vehicle for attached flow during an ascent, such as at one or more points 318 in example 300. In graphical representation 402, the maximum angle of ascent may be about 65 degrees, and an airspeed that corresponds with the maximum angle of ascent may be about 11 m/s.

Moreover, as noted, FIG. 4B is the graphical representation 404. In particular, the graphical representation 404 depicts an angle of ascent of an aerial vehicle in relation to $C_L$ of the aerial vehicle. In graphical representation 404, the angle of ascent may be measured in degrees, and $C_L$ may be a value without a unit of measurement. As shown in FIG. 4B, a point 404A on the graphical representation 404 may represent a maximum angle of ascent of an aerial vehicle for attached flow during an ascent, such as at one or more points 318 in example 300. In graphical representation 404, the maximum angle of ascent may be about 65 degrees, and the $C_L$ that corresponds with the maximum angle of ascent may be about 0.7.

Further, as noted, FIG. 4C is the graphical representation 406. In particular, the graphical representation 406 depicts a first component of a speed of an aerial vehicle in relation to a second component of the speed of the aerial vehicle. In graphical representation 406, the first and second components of speed of the aerial vehicle may be measured in m/s. In some examples, the first component of the speed of the aerial vehicle may be in a direction that is substantially parallel with the ground. Further, in some examples, the second component of the speed of the aerial vehicle may be in a direction that is substantially perpendicular with the ground.

As shown in FIG. 4C, a point 406A on the graphical representation 406 may represent a first and second component of a speed of the aerial vehicle when the aerial vehicle is at a maximum angle of ascent for attached flow during an ascent, such as at one or more points 318 in example 300. In graphical representation 406, the first component of the speed of the aerial vehicle that corresponds with the maximum angle of ascent may about 5 m/s, and the second component of the speed of the aerial vehicle that corresponds with the maximum angle of ascent may be about 10.25 m/s.

Figure 5A:
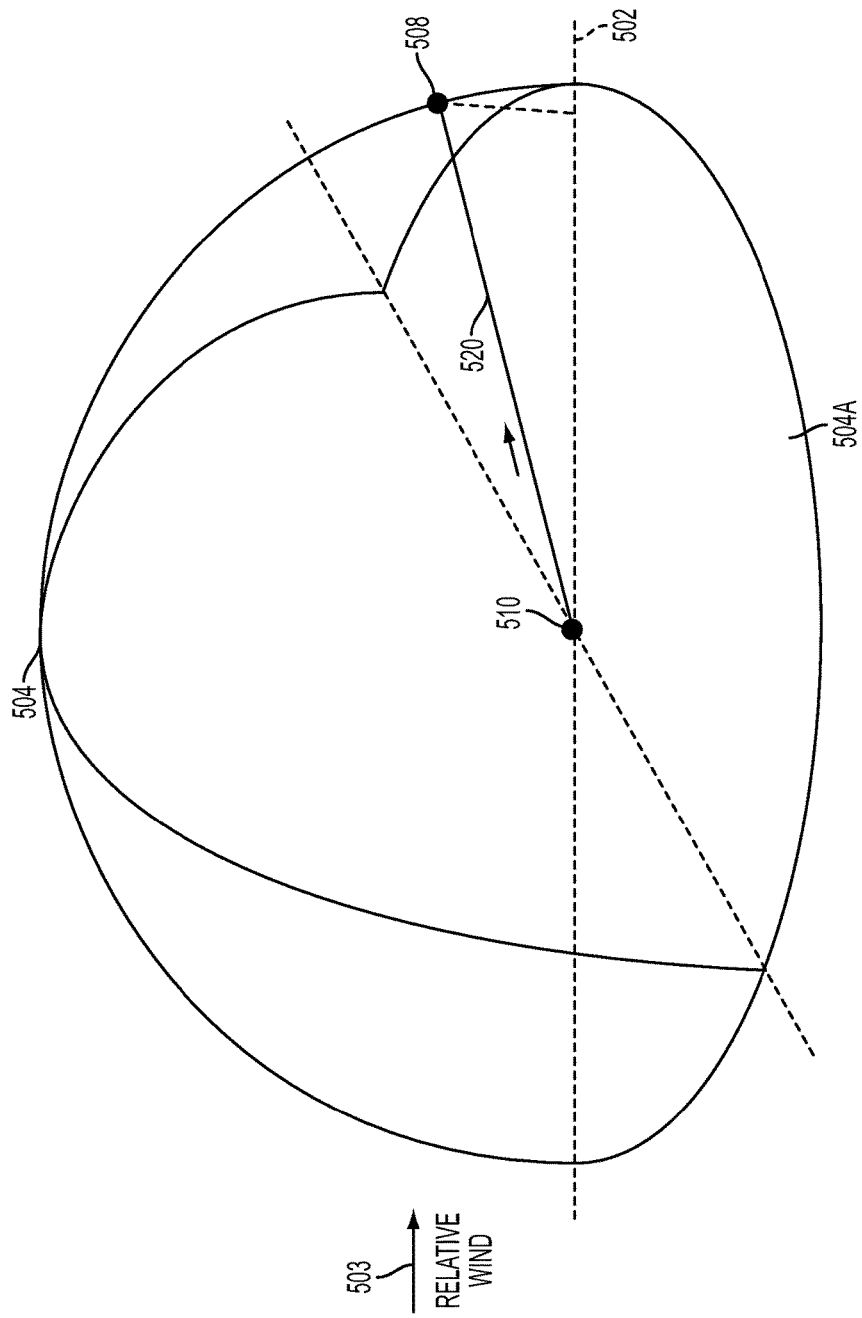
FIGS. 5A and 5B depict a tether sphere, according to an example embodiment.
Figure 5B:
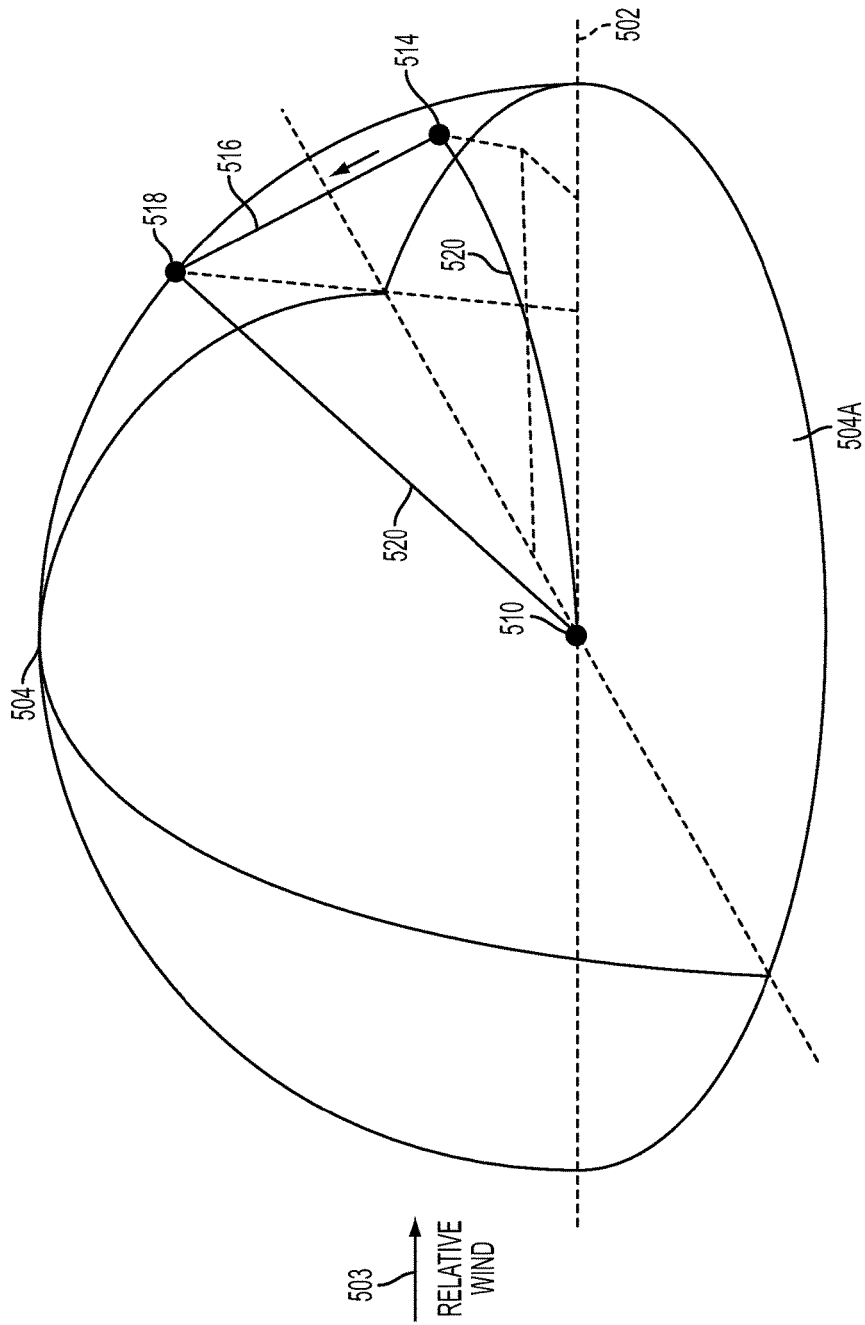

FIGS. 5A and 5B depict a tether sphere 504, according to an example embodiment. In particular, the tether sphere 504 has a radius based on a length of a tether 520, such as a length of the tether 520 when it is extended. As shown in FIGS. 5A and 5B, the tether 520 is connected to a ground station 510, and the ground station 510 is located on ground 502. Further, as shown in FIGS. 5A and 5B, relative wind 503 contacts the tether sphere 504. In FIGS. 5A and 5B, only a portion of the tether sphere 504 that is above the ground 502 is depicted. The portion may be described as one half of the tether sphere 504.

The ground 502 may take the form of or be similar in form to the ground 302, the tether sphere 504 may take the form of or be similar in form to the tether sphere 304, the ground station 510 may take the form of or be similar in form to the ground station 110 and/or the ground station 210, and the tether 520 may take the form of or be similar in form to the tether 120 and/or the tether 220.

Examples of transitioning an aerial vehicle between hover flight and crosswind flight described herein may be carried out in and/or substantially on a first portion 504A of the tether sphere 504. As shown in FIGS. 5A and 5B, the first portion 504A of the tether sphere 504 is substantially downwind of the ground station 510. The first portion 504A may be described as one quarter of the tether sphere 504. The first portion 504A of the tether sphere 504 may take the form of or be similar in form to the portion 304A of the tether sphere 304.

Moreover, examples of transitioning an aerial vehicle between hover flight and crosswind flight described herein may be carried out at a variety of locations in and/or on the first portion 504A of the tether sphere 504. For instance, as shown in FIG. 5A, while the aerial vehicle is in a hover-flight orientation, the aerial vehicle may be positioned at a point 508 that is substantially on the first portion 504A of the tether sphere 504.

Further, as shown in FIG. 5B, when the aerial vehicle transitions from the hover-flight orientation to a forward-flight orientation, the aerial vehicle may be positioned at a point 514 that is inside the first portion 504A of the tether sphere 504. Further still, as shown in FIG. 5B, when the aerial vehicle ascends in the forward-flight orientation to a point 518 that is substantially on the first portion 504A of the tether sphere 504, the aerial vehicle may follow a path 516. The path 516 may take the form of a variety of shapes. For instance, the path 516 may be a line segment, such as a chord of the tether sphere 504. Other shapes and/or types of shapes are possible as well.

The point 508 may correspond to point 308 in example 300, the point 514 may correspond to point 314 in example 300, the point 518 may correspond to point 318C in example 300, and the path 516 may take the form of or be similar in form to the path 316.

Further, in accordance with this disclosure, the point 508 and the point 518 may be located at various locations that are substantially on the first portion 504A of the tether sphere 504, and the point 514 may be located at various locations that are inside the first portion 504A of the tether sphere 504.

D. Transitioning an Aerial Vehicle from Crosswind Flight to Hover Flight

Figure 6A:
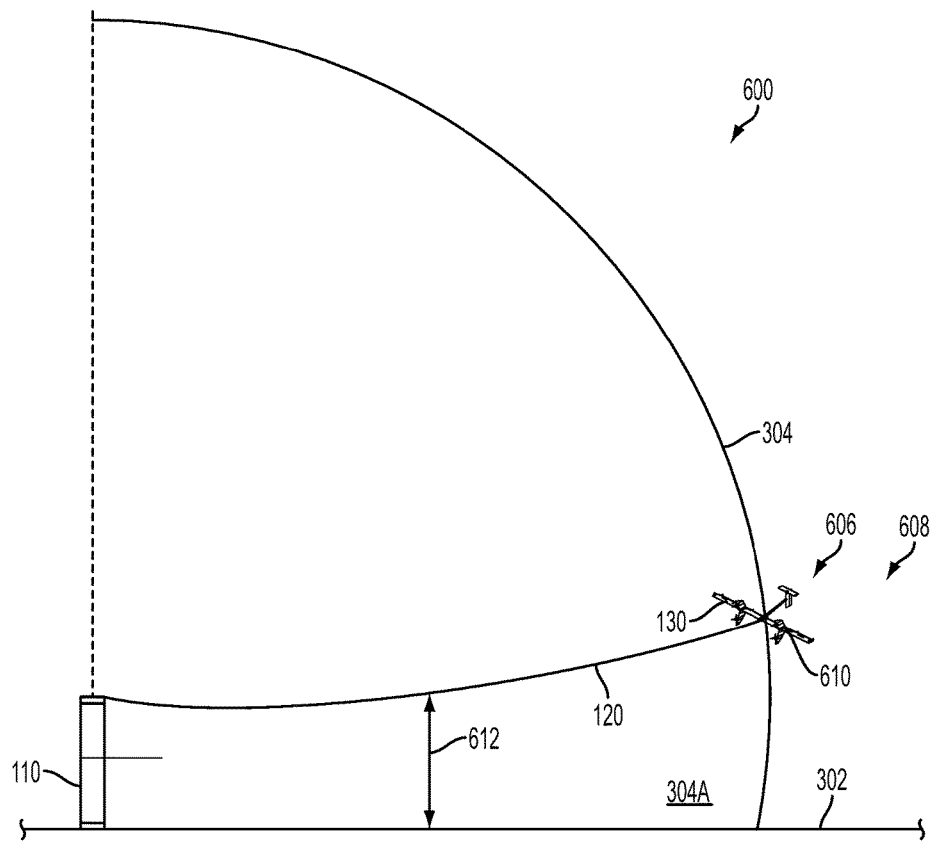
FIGS. 6A-C depict an example of an aerial vehicle transitioning from crosswind flight to hover flight, according to an example embodiment.
Figure 6B:
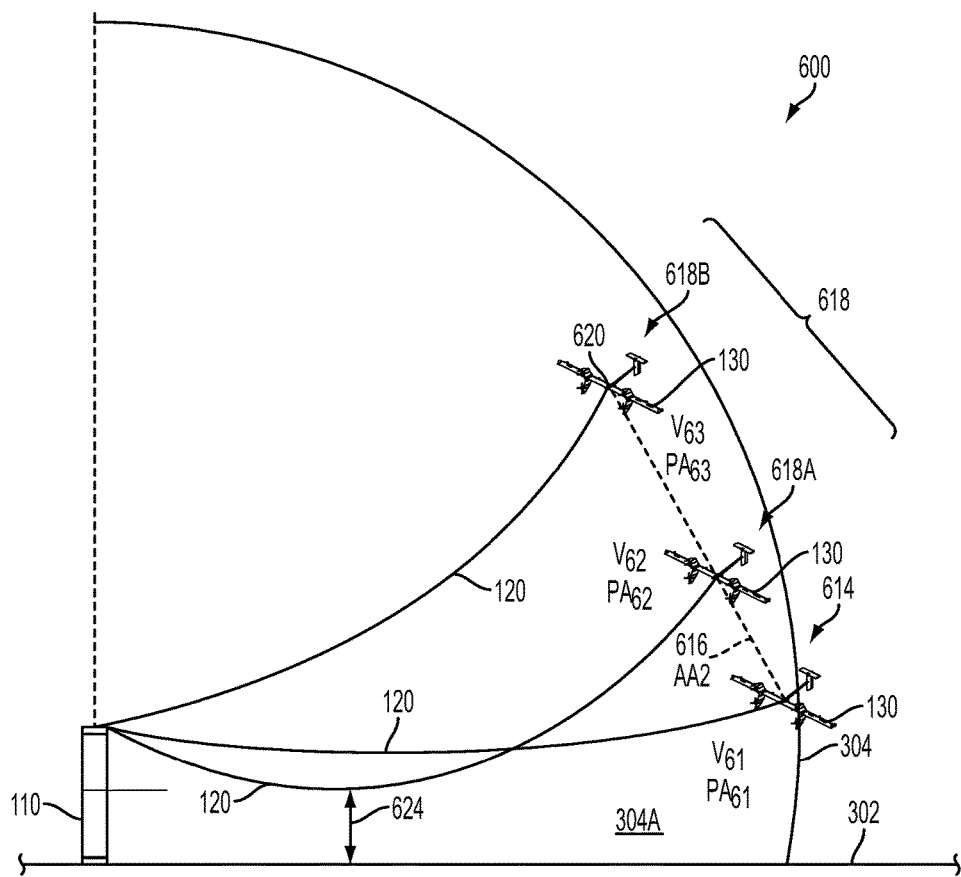
Figure 6C:
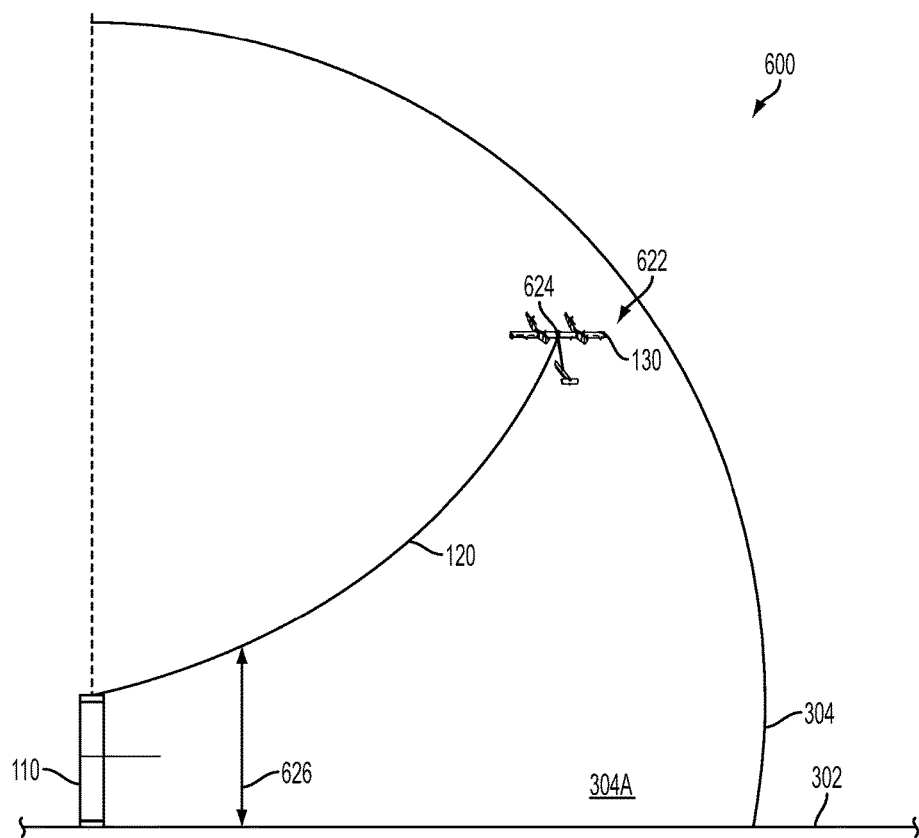

FIGS. 6A-C depict an example 600 of transitioning an aerial vehicle from crosswind flight to hover flight, according to an example embodiment. Example 600 is generally described by way of example as being carried out by the aerial vehicle 130 described above in connection with FIG. 1. For illustrative purposes, example 600 is described in a series of actions of the aerial vehicle 130 as shown in FIGS. 6A-C, though example 600 could be carried out in any number of actions and/or combination of actions.

As shown in FIG. 6A, the aerial vehicle 130 is connected to the tether 120, and the tether 120 is connected to the ground station 110. The ground station 110 is located on the ground 302. Moreover, as shown in FIG. 6A, the tether 120 defines the tether sphere 304. Example 600 may be carried out in and/or substantially on the portion 304A of the tether sphere 304.

Example 600 begins at a point 606 with operating the aerial vehicle 130 in a crosswind-flight orientation. When the aerial vehicle is in the crosswind-flight orientation, the aerial vehicle 130 may engage in crosswind flight. Moreover, at point 606 the tether 120 may be extended.

Example 600 continues at a point 608 with while the aerial vehicle 130 is in the crosswind-flight orientation, positioning the aerial vehicle 130 at a first location 610 that is substantially on the tether sphere 304. (In some examples, the first location 610 may be referred to as a third location). As shown in FIG. 6A, the first location 610 may in the air and substantially downwind of the ground station 110. The first location 610 may take the form of or be similar in form to the first location 310. However, in some examples, the first location 610 may have an altitude that is greater than an altitude of the first location 310.

For example, the first location 610 may be at a first angle from an axis that is substantially parallel to the ground 302. In some implementations, the angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

Moreover, at point 606 and point 608, a bottom of the tether 120 may be a predetermined altitude 612 above the ground 302. With this arrangement, at point 606 and point 608 the tether 120 may not contact the ground 302. The predetermined altitude 612 may be greater than, less than, and/or equal to the predetermined altitude 312.

Example 600 continues at a point 614 with transitioning the aerial vehicle from the crosswind-flight orientation to a forward-flight orientation, such that the aerial vehicle 130 moves from the tether sphere 120. As shown in FIG. 6B, the aerial vehicle 130 may move from the tether sphere 304 to a location toward the ground station 110.

When the aerial vehicle 130 is in the forward-flight orientation, the aerial vehicle may engage in forward flight. In some examples, transitioning the aerial vehicle 130 from the crosswind-flight orientation to the forward-flight orientation may involve a flight maneuver, such as pitching forward. Further, in such an example, the flight maneuver may be executed within a time period, such as less than one second.

At point 614, the aerial vehicle 130 may achieve attached flow. Further, at point 314, a tension of the tether 120 may be reduced. With this arrangement, a curvature of the tether 120 at point 614 may be greater than a curvature of the tether 120 at point 608.

Example 600 continues at one or more points 618 with operating the aerial vehicle 130 in the forward-flight orientation to ascend at an angle of ascent AA2 to a second location 620. (In some examples, the second location 620 may be referred to as a fourth location). As shown in FIG. 6B, the aerial vehicle 130 may fly substantially along a path 616 during the ascent at one or more points 618. In this example, one or more points 618 includes two points, a point 618A and point 618B. However, in other examples, one or more points 618 may include less than two or more than two points.

In some examples, the angle of ascent AA2 may be an angle between the path 618 and the ground 302. Further, the path 616 may take various different forms in various different embodiments. For instance, the path 616 may a line segment, such as a chord of the tether sphere 304. Other shapes and/or types of shapes are possible as well. The angle of ascent AA2 may take the form of or be similar in form to the angle of ascent AA1, and the path 616 may take the form of or be similar in form to the path 316.

In some implementations, at one or more points 618, the aerial vehicle 130 may ascend with substantially no thrust provided by the rotors 134A-D of the aerial vehicle 130.

With this arrangement, the aerial vehicle 130 may decelerate during the ascent. For instance, at one or more points 618, the rotors 134A-D of the aerial vehicle 130 may be shutoff. The term "substantially no," as used in this disclosure, refers to exactly no and/or one or more deviations from exactly no that do not significantly impact transitioning between certain flight modes as described herein.

Moreover, in some implementations, the aerial vehicle 130 may have attached flow during the ascent. And in such an implementation, effectiveness of one or more control surfaces of the aerial vehicle 130 may be maintained. Further, in such an implementation, example 600 may involve selecting a maximum angle of ascent, such that the aerial vehicle 130 has attached flow during the ascent. Moreover, in such an implementation, example 600 may involve adjusting a pitch angle of the aerial vehicle based on the maximum angle of ascent and/or adjusting thrust of the aerial vehicle 130 based on the maximum angle of ascent. In some examples, the adjusting thrust of the aerial vehicle 130 may involve using differential thrusting of one or more of the rotors 134A-D of the aerial vehicle 130.

As shown in FIG. 6B, at point 614 the aerial vehicle 130 may have a speed V61 and a pitch angle PA61; at point 618A the aerial vehicle 130 may have a speed V62 and a pitch angle PA62; and at point 618B the aerial vehicle 130 may have a speed V63 and a pitch angle PA63.

In some implementations, the angle of ascent AA2 may be selected before point 618A. With this arrangement, the pitch angle PA61 and/or the pitch angle PA62 may be selected based on the angle of ascent AA2. Further, in some examples, the pitch angle PA62 and the pitch angle PA63 may be equal to the pitch angle PA61. However, in other examples, the pitch angles PA61, PA62, and PA63 may be different than each other. For instance, PA61 may be greater or less than PA62 and/or PA63; PA62 may be greater or less than PA63 and/or PA61; and PA63 may be greater or less than PA61 and/or PA62. Further, PA63 may be selected and/or adjusted during the ascent. Further still, PA61 and/or PA62 may be adjusted during the ascent.

Moreover, in some implementations, the speed V61 and/or the speed V62 may be selected based on the angle of ascent AA2. Further, in some examples, the speed V62, and the speed V63 may be equal to the speed V61. However, in other examples, the speeds V61, V62, V63 may be different than each other. For example, the speed V63 may be less than the speed V62, and the speed V62 may be less than the speed V61. Further, speeds V61, V62, and V63 may be selected and/or adjusted during the ascent.

In some implementations, any of speeds V61, V62, and/or V64 may be a speed that corresponds with a minimum (or no) throttle of the aerial vehicle 130. Further, in some implementations, at the speed V62, the aerial vehicle 130 may ascend in a forward-flight orientation. Moreover, at the speed V62, the angle of ascent AA2 may be converged. As shown in FIG. 6, the second location 620 may be in the air and substantially downwind of the ground station 110. The second location 620 may be oriented with respect to the ground station 110 a similar way as the first location 610 may be oriented with respect to the ground station 110.

For example, the first location 610 may be at a first angle from an axis that is substantially parallel to the ground 302. In some implementations, the angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 610 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis.

At one or more points 618, a tension of the tether 120 may increase during the ascent. For example, a tension of the tether 120 at point 618B may be greater than a tension of the tether at point 618A, and a tension of the tether at point 618A may be greater than a tension of the tether at point 614.

With this arrangement, a curvature of the tether 120 may decrease during the ascent. For example, a curvature the tether 120 at point 618B may be less than a curvature of the tether 120 at point 618A. Further, in some examples, a curvature of the tether 120 at point 618A may be less than a curvature of the tether 120 at point 614.

Moreover, in some examples, when the aerial vehicle 130 includes a GPS receiver, operating the aerial vehicle 130 in the forward-flight orientation to ascend at an angle of ascent may involve monitoring the ascent of the aerial vehicle with the GPS receiver. With such an arrangement, control of a trajectory of the aerial vehicle 130 during the ascent may be improved. As a result, the aerial vehicle 130's ability to follow one or more portions and/or portions of the path 616 may be improved.

Further, in some examples, when the aerial vehicle 130 includes at least one pitot tube, operating the aerial vehicle 130 in the forward-flight orientation to ascend at an angle of ascent may involve monitoring an angle of attack of the aerial vehicle 130 or a side slip of the aerial vehicle 130 during the ascent with the at least one pitot tube. With such an arrangement, control of the trajectory of the aerial vehicle 130 during the ascent may be improved. As a result, the aerial vehicle's ability to follow one or more portions and/or points of the path 616 may be improved.

Moreover, as shown in FIG. 6B, at point 614 and point 618 a bottom of the tether 120 may be a predetermined altitude 624 above the ground 302. With this arrangement, at point 614 and point 618 the tether 120 may not touch the ground 302. In some examples, the predetermined altitude 624 may be less than the predetermined altitude 612. And the predetermined altitude 624 may be greater than, less than, and/or equal to the predetermined the predetermined altitude 324. In some implementations, the predetermined altitude 624 may be greater than one half of the height of the ground station 110. And in at least one such implementation, the predetermined altitude 624 may be 6 meters.

Example 600 continues at a point 622 with transitioning the aerial vehicle 130 from the forward-flight orientation to a hover-flight orientation. In some examples, transitioning the aerial vehicle 130 from the forward-flight orientation to the hover-flight orientation may involve a flight maneuver. Further, transitioning the aerial vehicle 130 from the forward-flight orientation to the hover-flight orientation may occur when the aerial vehicle 130 has a threshold speed, such as 15 m/s. In some implementations, transitioning the aerial vehicle 130 from the forward-flight orientation to the hover-flight orientation may occur when the speed V63 is 15 m/s. Further, at point 622, a tension of the tether 120 may be greater than a tension of the tether at point 618B.

During the transition from the forward-flight orientation to the hover-flight orientation, the aerial vehicle 130 may be positioned at third location 624 (In some examples, the third location 624 may be referred to as a fifth location). As shown in FIG. 6C, the third location 624 may be in the air and substantially downwind of the ground station 110. In some implementations, the third location 624 could be the same as or similar to the second location 620. When the third location 624 is not substantially on the tether sphere 304, after point 622 the aerial vehicle 130 may be blown by the wind to a fourth location (not shown) that is substantially on the tether sphere 304.

Moreover, as shown in FIG. 6C, at point 622 a bottom of the tether 120 may be a predetermined altitude 626 above the ground 302. With this arrangement, at point 626 the tether 120 may not touch the ground 302. In some examples, the predetermined altitude 626 may be greater than the predetermined altitude 612 and/or the predetermined altitude 624.

Thus, example 600 may be carried out so that the tether 120 may not contact the ground 602. With such an arrangement, the mechanical integrity of the tether 120 may be improved. For example, the tether 120 might not catch on (or tangle around) objects located on the ground 302. As another example, when the tether sphere 304 is located above a body of water described herein, the tether 120 might not be submersed in the water. In addition, with such an arrangement, safety of one or more people located near the ground station 110 (e.g., within the portion 304A of the tether sphere 304) may be improved.

In addition, example 600 may be carried out so that a bottom of the tether 120 remains above the predetermined altitude 624. With such an arrangement, the mechanical integrity of the tether 120 may be improved as described herein and/or safety of one or more people located near the ground station may be improved.

Moreover, one or more actions that correspond with points 606-622 may be performed at various different time periods in various different embodiments. For instance, the one or more actions that correspond with point 606 may be performed at a first time period, the one or more actions that correspond with point 608 may be performed at a second time period, the one or more actions that correspond with point 614 may be performed at a third time period, the one or more actions that correspond with point 618A may be performed at a fourth time period, the one or more actions that correspond with point 618B may be performed at a fifth time period, and the one or more actions that correspond with point 622 may be performed at a seventh time period. However, in other examples, at least some of the actions of the one or more actions that correspond with points 606-622 may be performed concurrently.

Although example 600 has been described above with reference to FIGS. 6A-C, in accordance with this disclosure, point 608 and point 622 may occur at various locations that are substantially on the portion 304A of the tether sphere 304, and point 614 and one or more points 618 may occur at various locations that are inside the portion 304A of the tether sphere.

III. OFFSHORE AIRBORNE WIND TURBINE SYSTEMS

Airborne wind turbines may provide a significant advantage over conventional wind turbines when it comes to offshore power generation. In particular, strong, consistent winds may be found in deep offshore locations (e.g., in water that is 30 meters deep or deeper). However, for offshore applications, conventional wind turbines typically have towers extending from above the ocean surface down to the seabed. The deeper the water, the greater the size of the tower. Therefore, the use of conventional wind turbines for deep water applications may not be viable because the cost of building and/or installing such towers may be prohibitively expensive in many offshore locations.

Example embodiments herein are directed to offshore airborne wind turbine systems with an aerial vehicle connected via a tether to an underwater buoyant body where the buoyancy is adjustable. This can reduce or eliminate the need for a heavy and power-hungry winching system to deploy or reel in the tether equipped aerial vehicle. This is particularly advantageous in deep offshore applications where infrastructure carries significant construction and maintenance costs.

In one embodiment, the tether may be routed down through an undersea mooring and back up to an underwater buoyant body where the buoyancy is adjustable, such as an inflatable bladder. In another embodiment, the tether may be routed through a floating landing platform to an underwater buoyant body. In the various embodiments, the buoyancy of the body may be adjusted depending on the flight mode of the aerial vehicle.

In various embodiments with a floating platform, the floating platform may be relatively small because when the aerial vehicle is in flight, the airborne wind turbine system is insensitive to sway at of the platform caused by wave action or wind. In other words, during crosswind flight, it may not matter if a tether coupling point on the floating platform sways above the surface of the water.

A ballast or mass may be provided at the bottom of the floating platform to help maintain the platform in an upright position to provide stability during takeoff and landing. As examples, the mass may be water, fill, steel, or concrete positioned in the bottom of the platform to provide stability.

A. Moored Adjustably Buoyant Body

Figure 7:
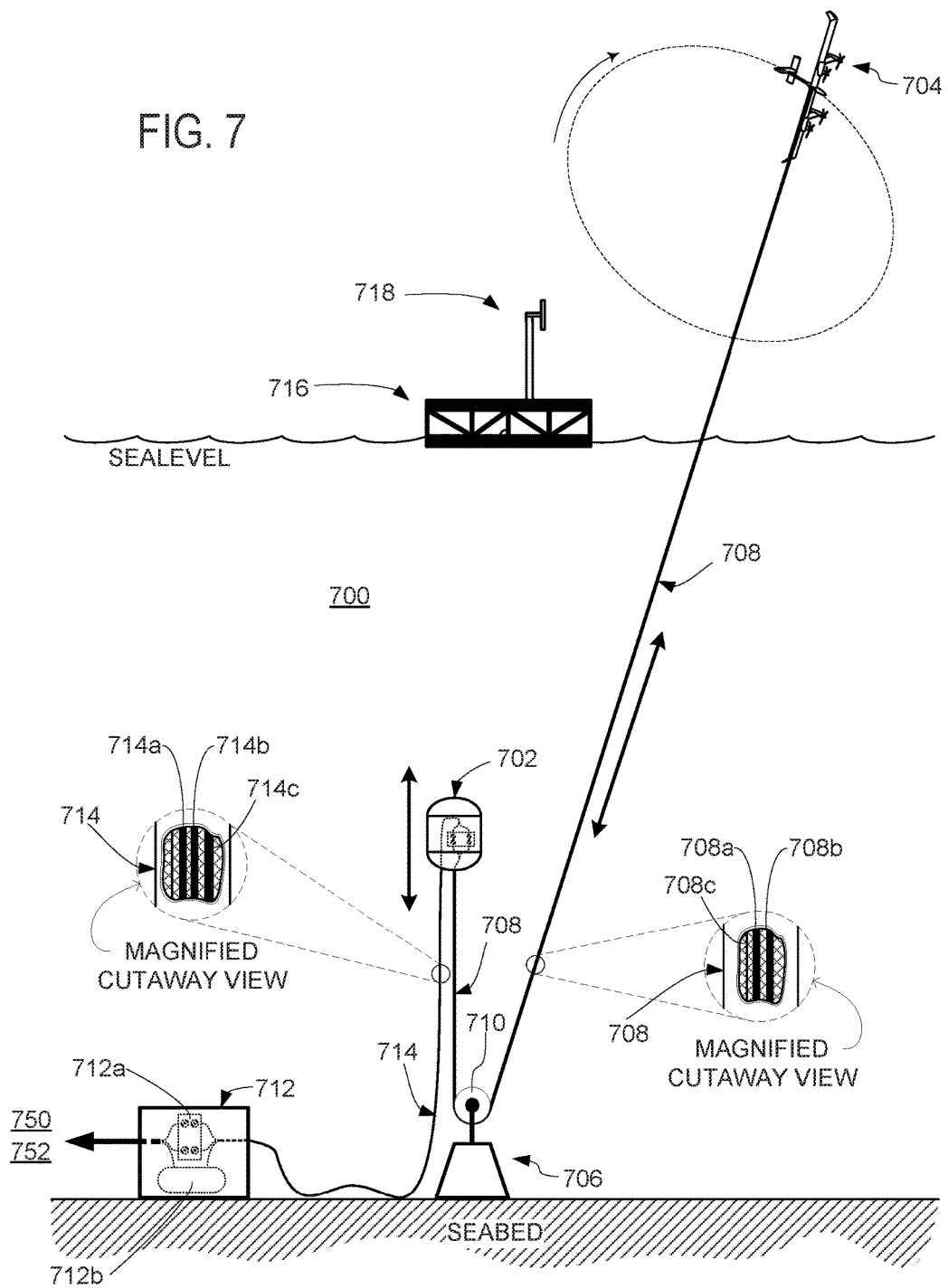
FIG. 7 depicts an offshore airborne wind turbine system with a flying aerial vehicle connected through an undersea mooring to an adjustably buoyant body.

FIG. 7 depicts an offshore airborne wind turbine system 700 according to an example embodiment. Aerial vehicle 704 is shown in flight and may be the same or similar to aerial vehicles described above with respect to FIGS. 1 to 6C. As illustrated, aerial vehicle 704 is in a crosswind flight mode flying an example elliptical path. The same or similar components in the systems described above with respect to FIGS. 1 to 6C may be included in system 700, including, for example, those described with respect to FIG. 2.

A tether 708 connects the aerial vehicle 704 to an adjustably buoyant body 702. The tether 708 may be the same or similar to tethers described above with respect to FIGS. 1 to 6C. The tether 708 may contain one or more insulated conductors 708$a$ and 708$b$ that allow transmission of electrical power to and from the aerial vehicle 704. The tether 708 may further include optical or other communication conduits 708$c$ that allow communication with the aerial vehicle 704. The tether 708 may be electrically connected via utility line 714, which may include one or more insulated conductors 714$a$ and 714$b$, to a utility box 712 that is in proximity to an underwater mooring 706. The connection between the utility line 714 and the tether 708 may be at the buoyant body 702 or at another location along the tether 708. The utility box 712 may include an electrical junction 712$a$ connected to one or more electrical conductors e.g., 714$a$, 714$b$. The electrical junction 712$a$ may be electrically connected to an external power system 750, such as an energy storage system and/or an electrical energy grid system.

The tether 708 may be coupled to the underwater mooring 706 and configured to move through the underwater mooring 706. One portion of the tether 708 may extend upwards from the underwater mooring 706 and be secured to the aerial vehicle 704. Another portion of the tether 708 may extend upwards from the underwater mooring 706 and be secured to the adjustably buoyant body 702.

The tether 708 may be capable of carrying tension loads sufficient to restrain the aerial vehicle during all flight modes, including crosswind flight and heavy gusts. The tether 708 may further be insulated and protected against electrical leakage into the water environment and sufficiently resilient to resist abrasion and physical wear both from contact with other components in the system and natural structures such as the seabed.

The mooring 706 may be located at the seabed as illustrated. The mooring 706 may be any mooring type that is sufficient to resist the pulling force of the aerial vehicle 704 during any flight mode. The mooring 706 is preferably a gravity anchor positioned at the seabed. The mooring 706 is illustrated as a pyramid anchor, though other gravity anchors such as mushroom anchors are also acceptable. Other examples of mooring 706 include a helical screw anchor, suction bucket, and piles such as drilled and grouted piles, pin piles, hammered piles, etc.

To allow the tether 708 to move through the mooring 706 while remaining coupled to the mooring 706, the mooring 706 may include a retention structure 710 to permit the tether to slide or roll through the mooring 706. In the non-limiting example shown in FIG. 7, the retention structure 710 is illustrated as a pulley around which the tether 708 rolls as it moves through the mooring 706. Other retention structure may include, for example and without limitation, a ring structure (e.g., an eye-bolt), a shaped tube through which the tether passes, or one or more rollers. Preferably the retention structure 710 includes a guide (not shown) to prevent the tether 708 from unintentionally de-coupling from the retention structure.

FIG. 7 additionally illustrates an example landing platform 716 for the aerial vehicle 704. The landing platform 716 is preferably a floating platform and may be moored to the seabed via one or more mooring lines (not shown for clarity). Alternatively, the landing platform may extend to the seabed. The platform 716 may include an aerial vehicle perch 718 which may extend from the platform 716. The perch 710 may be the same or similar to perches described above with respect to FIGS. 1 to 6C. In the illustrated example, the landing platform is illustrated as an elevated and substantially flat platform; however, other example forms are also possible. As non-limiting examples, the landing platform 716 may take the general form of a spar buoy, a barge platform, or an elevated platform with multiple pontoons. The spar buoy form provides benefits in that it provides buoyancy sufficient to carry the weight of the landed aerial vehicle 704 while presenting a low cross-section to wave action.

As illustrated, the tether 708 has a portion extending up from the mooring 706 to the adjustably buoyant body 702 and another portion extending up from the mooring 706 to the aerial vehicle 704. The relative lengths of the two portions of the tether 708 may change as the adjustably buoyant body 702 moves up and down as its buoyancy changes and/or as the aerial vehicle 704 increases or decreases its pulling force on the tether 708 through changes in flight mode or flight dynamics. Generally, and ignoring small variations, the buoyant body 702 will go up as the aerial vehicle 704 drops in elevation or moves closer to the mooring 706 and the buoyant body 702 will go down as the aerial vehicle 704 increases in elevation or moves away from the mooring 706.

It may be desirable to set or maintain a relative or specific level of tension in the portion of the tether 708 extending from the mooring 706 to the aerial vehicle 704, and by extension, from the buoyant body 702 to the aerial vehicle 704. Tension may provide a necessary counter-force against the wind when the aerial vehicle 704 is engaged in crosswind flight mode. Tension may provide a reel-in force when the aerial vehicle 704 ends crosswind flight and approaches the landing platform 716 for landing. Tension may provide a reel-out force when the aerial vehicle 704 takes off from the landing platform 716 and heads out to engage in crosswind flight. Tension may prevent the tether 708 from becoming slack and dragging through the water or resting on the seabed.

To maintain a minimum or specific level of tension in the tether 708, or to change respective length of the tether 708 portions during movement of the aerial vehicle, the buoyancy of the adjustably buoyant body 702 may be adjusted. For example, if the aerial vehicle 704 is engaged in crosswind flight mode, it may be desirable to set a positive buoyancy magnitude at the buoyant body 702 sufficient to provide a counter-force to the wind and flight dynamics of the aerial vehicle without providing an excessive pulling force that pulls the aerial vehicle 704 from its preferred flight path.

As another example for when the aerial vehicle 704 is engaged in crosswind flight mode, it may be desirable to set a neutral or slightly negative buoyancy magnitude at the buoyant body 702, such that the aerial vehicle 704 can pull the adjustably buoyant body 702 against the mooring 706 or some other hard stop, and use that physical restraint on the tether 708 to provide tension in the tether 708.

As another example, when the aerial vehicle 704 ends crosswind flight and approaches the landing platform 716 for landing, the buoyancy of the buoyant body 702 may be increased (i.e., made sufficiently positive) to provide a reel-in force acting against the aerial vehicle 704 or to keep the tether 708 from drooping and/or dragging as the aerial vehicle 704 flies without a reel-in assist.

As another example, the buoyancy of the buoyant body 702 may be increased when the vehicle is landing to take up slack in the line, and then adjusted after landing to substantially neutral buoyancy to keep the line from dropping to the seabed, but also to prevent tension on the landed aerial vehicle 704 from the tether 708.

The buoyancy of the adjustably buoyant body 702 body may be changed by numerous methods. As a non-limiting example, the buoyant body 702 may take on or expel water from a volume within the buoyant body 702. This may be accomplished, for example, via a water pump or the introduction, removal and storage, or venting of pressurized air into or from the volume. The buoyant body 702 may carry a reservoir of pressurize air and an air pump for removably introducing air to the volume. Alternatively or additionally, the buoyant body 702 may receive pressurized air from an external source. For example, the utility line 714 may include an air hose 714c configured to transfer external air between an external air source and the buoyant body 702, such as an air source in the utility box 712. The utility box 712 may have an air reservoir 712b and/or may receive air from an above-water air source 752.

Figure 8:
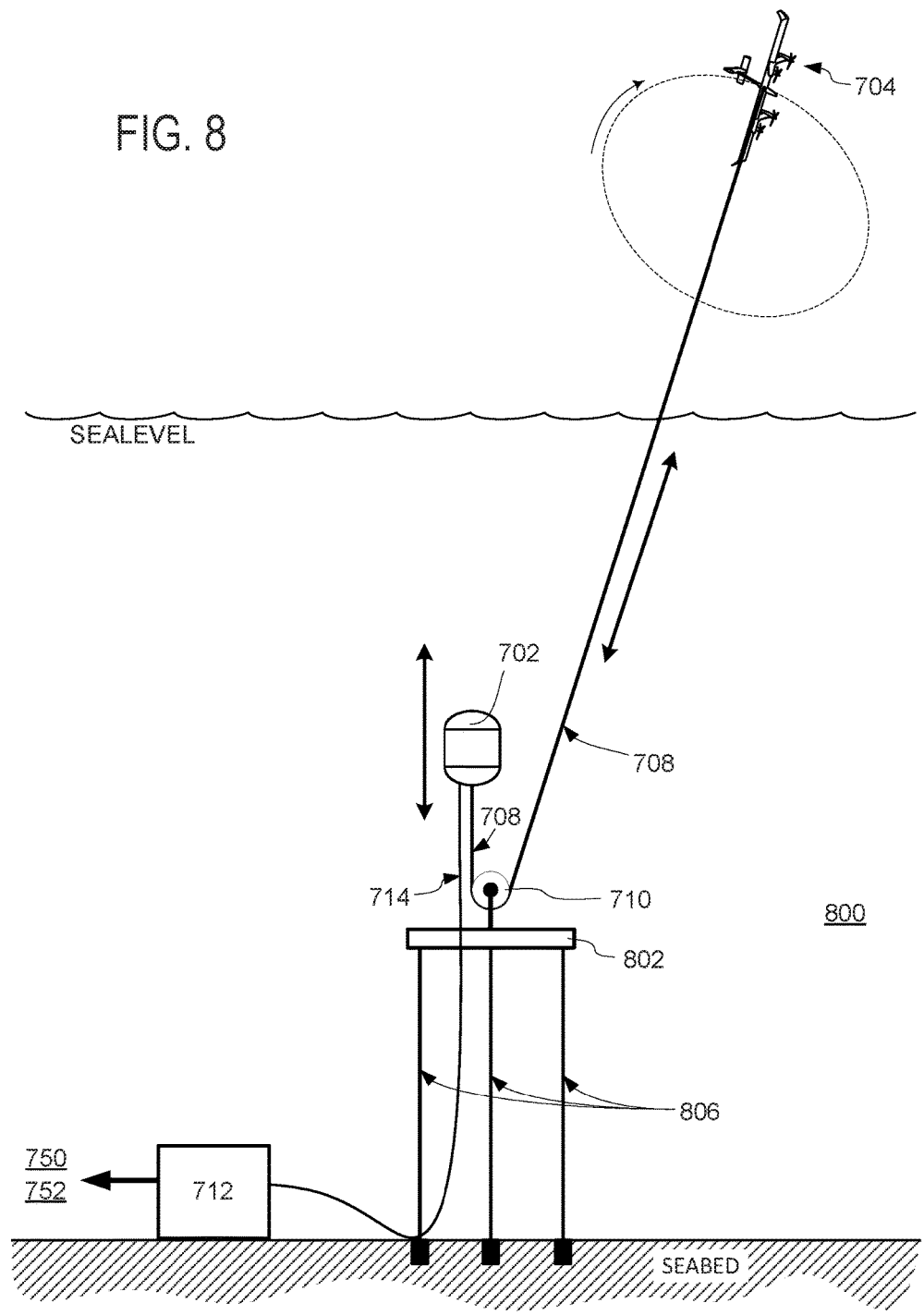
FIG. 8 depicts an offshore airborne wind turbine system with a flying aerial vehicle connected through an undersea mooring to an adjustably buoyant body.

FIG. 8 depicts an offshore airborne wind turbine system 800 very similar to the system 700 described with respect to FIG. 7, and the same or similar components in the systems described above with respect to FIGS. 1 to 6C may be included in system 800, including, for example, those described with respect to FIG. 2. A notable difference is that the underwater mooring 802 is not located at the seabed, but is instead a submerged mooring anchored above the seabed, preferably via one or more anchor lines 806 extending to and anchored in the seabed. The underwater mooring 802 may preferably take the form of, as non-limiting examples, a single anchor leg mooring, a tension leg mooring, or a guyed mooring.

As another example, an underwater mooring may have its retention structure 710 high above the seafloor (as in FIG. 8), but be located at the top of a structure extending to the seafloor without the use of anchor lines 806, such as a pile.

B. Non-Moored Adjustably Buoyant Body

Figure 9:
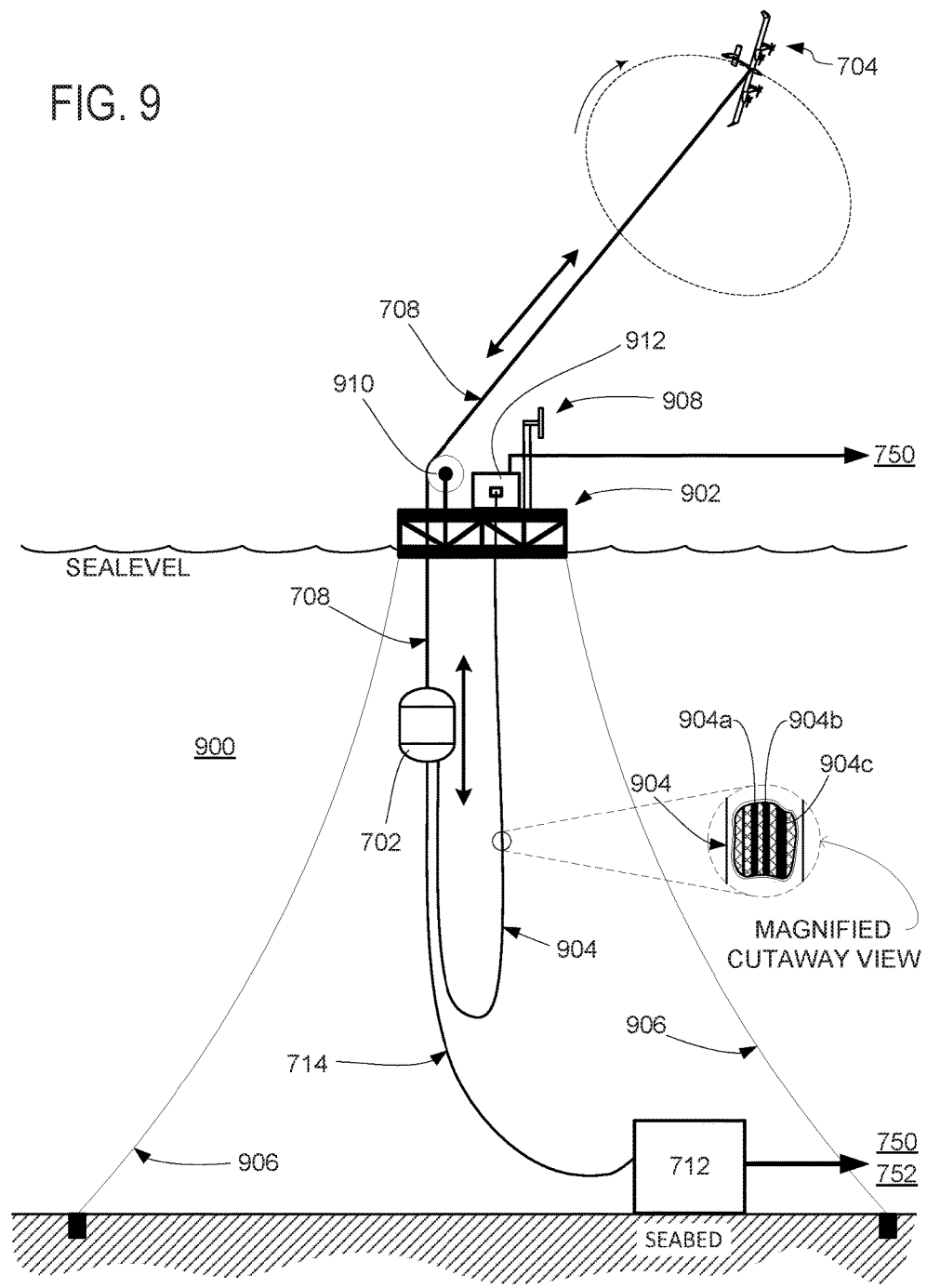
FIG. 9 depicts an offshore airborne wind turbine system with a flying aerial vehicle connected through a floating platform to an adjustably buoyant body.

FIG. 9 depicts an offshore airborne wind turbine system 900 with an aerial vehicle 704 connected via a tether 708 through a floating platform 902 to an adjustably buoyant body 702. The same or similar components in the systems described above with respect to FIGS. 1 to 6C may be included in system 900, including, for example, those described with respect to FIG. 2. Aerial vehicle 704 is shown in flight and may be the same or similar to aerial vehicles described above with respect to FIGS. 1 to 6C. As illustrated, aerial vehicle 704 is in a crosswind flight mode flying an example elliptical path. The floating platform 902 may be configured as a landing platform for the aerial vehicle 704, and may include a landing perch 908, as described with respect to FIG. 7. The floating platform 902 may be moored to the seabed by, for example, one or more mooring lines 906 which may be guy lines and/or tension lines, and, for example, the floating platform may be configured as a spar buoy, a deepwater spar, a tension leg platform, or another type of functionally stable platform.

The tether 708 may be the same or similar to tethers described above with respect to FIGS. 1 to 8. The tether 708 may be electrically connected via utility line 714 to a utility box 712 the same or similarly as described above with respect to FIGS. 7 and 8. The utility line 714 and utility box 712 may also be the same or similar as described above with respect to FIGS. 7 and 8, including the connection to an external power system 750.

The tether 708 may be coupled to the floating platform 902 and configured to move through the floating platform 902. One portion of the tether 708 may extend upwards from the floating platform 902 and be secured to the aerial vehicle 704. Another portion of the tether 708 may extend downwards from the floating platform 902 and be secured to the adjustably buoyant body 702.

To allow the tether 708 to move through the floating platform 902 while remaining coupled to the floating platform 902, the floating platform 902 may include a retention structure 910 to permit the tether to slide or roll through the floating platform 902. In the non-limiting example shown in FIG. 9, the retention structure 910 is illustrated as a pulley around which the tether 708 rolls as it moves through the mooring 706. Other retention structure may include, for example and without limitation, a ring structure (e.g., an eye-bolt), a shaped tube through which the tether passes, or one or more rollers. Preferably the retention structure 910 includes a guide (not shown) to prevent the tether 708 from unintentionally de-coupling from the retention structure.

As illustrated, the tether 708 has a portion extending up from the floating platform 902 to the aerial vehicle 704 and another portion extending down from the floating platform 902 to the adjustably buoyant body 702. The relative lengths of the two portions of the tether 708 may change as the adjustably buoyant body 902 moves up and down as its buoyancy changes and/or as the aerial vehicle 704 increases or decreases its pulling force on the tether 708 through changes in flight mode or flight dynamics. Generally, and ignoring small variations, the adjustably buoyant body 702 will go down as the aerial vehicle 704 drops in elevation or moves closer to the floating platform 902 and the adjustably buoyant body 702 will go up as the aerial vehicle 704 increases in elevation or moves away from the floating platform 902.

It may be desirable to maintain a specific level of tension in the portion of the tether 708 extending from the floating platform 902 to the aerial vehicle 704, for the same or similar reasons as described with respect to FIG. 7.

To maintain a minimum or specific level of tension in the tether 708, or to change respective length of the tether 708 portions during movement of the aerial vehicle 704, the buoyancy of the adjustably buoyant body 702 may be adjusted. For example, if the aerial vehicle 704 is engaged in crosswind flight mode, it may be desirable to set a negative buoyancy magnitude at the adjustably buoyant body 702 sufficient to provide a counter-force to the wind and flight dynamics of the aerial vehicle without providing an excessive pulling force that pulls the aerial vehicle 704 from its preferred flight path.

As another example for when the aerial vehicle 704 is engaged in crosswind flight mode, it may be desirable to set a neutral or slightly positive buoyancy magnitude at the buoyant body 902, such that the aerial vehicle 704 can pull the adjustably buoyant body 702 against the floating platform 902 or some other hard stop, and use that physical restraint on the tether 708 to provide tension in the tether 708.

As another example, when the aerial vehicle 704 ends crosswind flight and approaches the floating platform 902 for landing, the buoyancy of the adjustably buoyant body 702 may be decreased (i.e. made sufficiently negative) to provide a reel-in force acting against the aerial vehicle 704 or to keep the tether 708 from drooping and/or dragging as the aerial vehicle 704 flies without a reel-in assist.

As another example, the buoyancy of the adjustably buoyant body 702 may be decreased when the vehicle is landing to take up slack in the line, and then adjusted after landing to substantially neutral buoyancy or very slightly negative to keep the line from tangling, but also to prevent any significant tension on the landed aerial vehicle 704 from the tether 708.

The buoyancy of the adjustably buoyant body 902 body may be changed by numerous methods, such as those described with respect to FIG. 7. Additionally or alternatively, the system may include a utility line 904, including one or more insulated conductors 904a, 904b and air hose 904c, that is substantially similar to the utility line 714 and similarly connected to the tether 708 and/or adjustably buoyant body 702, except that instead of connecting to utility box 712, it connects to a utility box 912 located on the floating platform 902 or elsewhere on the surface. Except for its location, utility box 912 may be the same or substantially similar to utility box 712 and may be configured to carry out the same functionality.

C. Method for Winching Aerial Vehicle Using an Adjustably Buoyant Body

Figure 10:
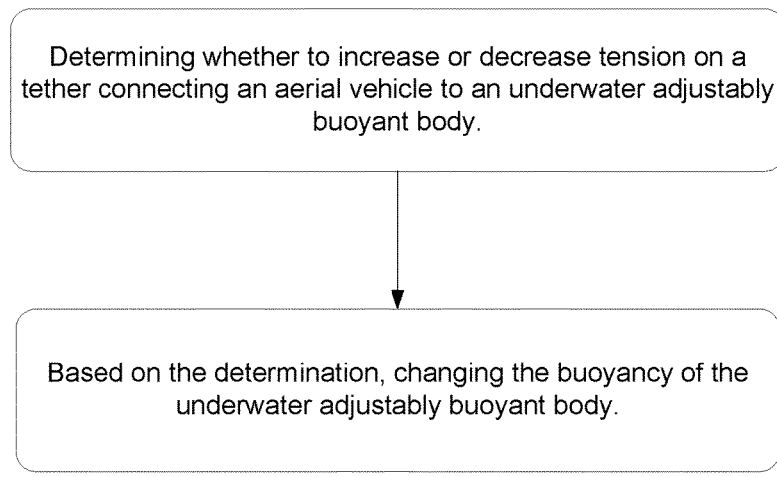
FIG. 10 depicts an illustrative method embodiment.

FIG. 10 depicts an illustrative method embodiment that may be implement in any of the offshore systems described above. As discussed above, it may be desirable to set or maintain a tension on the tether connecting the aerial vehicle and the adjustable buoyant body. Accordingly, a processor and alternatively or additionally other devices may determine whether to increase or decrease tension on a tether connecting an aerial vehicle to an underwater adjustably buoyant body. The determination may be based, for example, on flight mode and/or flight dynamics (e.g., wind speed, flight path, aerial vehicle speed, aerial vehicle elevation and/or distance, etc.) and alternatively or additionally, design limits or operating parameters, such as tether strength or desired pulling force against the aerial vehicle. Based on the determination, a processor and alternatively or additionally other devices may effect a change to the buoyancy of the underwater adjustably buoyant body. For example, a control system may direct a pump to add or expel water to or from the buoyant body, and the pump may accomplish that direction.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An offshore airborne wind turbine system, comprising:
an aerial vehicle;
an underwater mooring;
an adjustably buoyant body, wherein the adjustably buoyant body is underwater; and
a tether coupled to the underwater mooring and configured to move through the underwater mooring, the tether comprising:
a first portion extending upwards from the underwater mooring and coupled to the aerial vehicle, and
a second portion extending upwards from the underwater mooring and coupled to the adjustably buoyant body.

2. The system of claim 1, further comprising:
an electrical junction electrically connected to a power system external to the offshore airborne wind turbine system; and
a first insulated conductor electrically coupled to the electrical junction,
wherein the tether comprises a second insulated conductor electrically coupled to the first insulated conductor and to the aerial vehicle.

3. The system of claim 2, wherein the first insulated conductor is coupled to the second insulated conductor at the adjustably buoyant body.

4. The system of claim 1, further comprising:
a pressurized air source; and
an air line connected between the pressurized air source and the adjustably buoyant body, wherein the pressurized air source is configured to transfer air via the air line between the pressurized air source and the adjustably buoyant body for adjusting the buoyancy of the adjustably buoyant body.

5. The system of claim 1, wherein the underwater mooring comprises an anchor at a seabed.

6. The system of claim 1, wherein the underwater mooring comprises:
a submerged mooring anchored above a seabed; and
a mooring line extending to the seabed.

7. The system of claim 1, further comprising a floating platform configured as a landing platform for the aerial vehicle.

8. An offshore airborne wind turbine system, comprising:
an aerial vehicle;
a floating platform configured as a landing platform for the aerial vehicle;
an adjustably buoyant body; and
a tether coupled to the floating platform and configured to move through the floating platform, the tether comprising:
a first portion extending upwards from the floating platform and coupled to the aerial vehicle, and
a second portion extending downwards from the floating platform and coupled to the adjustably buoyant body.

9. The system of claim 8, further comprising:
an electrical junction electrically connected to a power system external to the offshore airborne wind turbine system; and
a first insulated conductor electrically coupled to the electrical junction,
wherein the tether comprises a second insulated conductor electrically coupled to the first insulated conductor and to the aerial vehicle.

10. The system of claim 9, wherein the first insulated conductor is coupled to the second insulated conductor at the adjustably buoyant body.

11. The system of claim 8, further comprising a first insulated conductor electrically coupled to the floating platform, wherein the tether comprises a second insulated conductor electrically coupled to the first insulated conductor and to the aerial vehicle.

12. The system of claim 11, wherein the first insulated conductor is coupled to the second insulated conductor at the adjustably buoyant body.

13. The system of claim 8, further comprising:
a pressurized air source; and
an air line connected between the pressurized air source and the adjustably buoyant body, wherein the pressurized air source is configured to transfer air via the air line between the pressurized air source and the adjustably buoyant body for adjusting the buoyancy of the adjustably buoyant body.

14. The system of claim 8, wherein the floating platform comprises a mooring line extending to a seabed.

* * * * *